United States Patent
Bourdelais et al.

(10) Patent No.: US 6,329,113 B1
(45) Date of Patent: Dec. 11, 2001

(54) IMAGING MATERIAL WITH DIMENSIONAL ADJUSTMENT BY HEAT

(75) Inventors: Robert P. Bourdelais, Pittsford; Peter T. Aylward, Hilton; Alphonse D. Camp; Geoffrey Mruk, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/586,913

(22) Filed: Jun. 5, 2000

(51) Int. Cl.[7] ............... G03C 1/93; G03C 1/79; G03C 1/795; G03C 11/22; G03G 5/10

(52) U.S. Cl. .......... 430/60; 430/349; 430/201; 430/350; 430/523; 430/533; 430/534; 430/536; 430/538; 430/930; 430/939; 347/105; 428/483; 428/500; 428/511; 428/512; 428/516; 428/537.6; 428/910

(58) Field of Search ................. 430/349, 536, 430/538, 939, 930, 201, 350, 533, 523, 534, 60; 347/105; 428/910, 483, 500, 511, 512, 516, 537.6

(56) References Cited

U.S. PATENT DOCUMENTS

| | | |
|---|---|---|
| 4,971,950 | 11/1990 | Kato et al. . |
| 5,023,143 | 6/1991 | Nelson .................... 428/516 |
| 5,234,733 | 8/1993 | Schloegl et al. .......... 428/215 |
| 5,244,861 | 9/1993 | Campbell et al. ........ 430/201 |
| 5,292,561 | 3/1994 | Peiffer et al. ........... 428/35.1 |
| 5,296,447 | 3/1994 | Suto et al. . |
| 5,314,749 | 5/1994 | Shah .......................... 428/516 |
| 5,403,635 | 4/1995 | Hoffman ................... 428/34.7 |
| 5,643,664 | 7/1997 | Kwong et al. ............ 428/523 |
| 5,813,540 | 9/1998 | Vollbrecht et al. ....... 206/497 |
| 5,866,282 | 2/1999 | Bourdelais et al. ...... 430/536 |
| 5,888,643 | 3/1999 | Aylward et al. .......... 430/536 |
| 5,902,720 | 5/1999 | Haydock et al. ......... 430/536 |
| 5,994,045 | * 11/1999 | Bourdelais et al. ...... 430/536 |
| 6,040,124 | * 3/2000 | Aylward et al. .......... 430/536 |
| 6,114,102 | * 9/2000 | Aylward et al. .......... 430/536 |

FOREIGN PATENT DOCUMENTS

| | | |
|---|---|---|
| 409 597 | 1/1991 | (EP) . |
| 2-38089 | 2/1990 | (JP) . |

* cited by examiner

Primary Examiner—Richard L. Schilling
(74) Attorney, Agent, or Firm—Paul A. Leipold

(57) ABSTRACT

The invention relates to an imaging member comprising a base wherein said base comprises at least one layer of heat shrinkable sheet and at least one strength layer.

30 Claims, 3 Drawing Sheets

IMAGING MATERIAL WITH DIMENSIONAL ADJUSTMENT BY HEAT

FIELD OF THE INVENTION

This invention relates to printing media. In a preferred form it relates to an improved base for imaging materials.

BACKGROUND OF THE INVENTION

Imaging output such as color photographs, ink jet images or thermal dye transfer images are typically designed to be flat and planner. A flat, planner image is desired, as the viewing and handling of the image is optimized and preferred by the consumer. There is, however, a need for an image that can be formed into a non planner shape without the need for mechanical constraint of the image.

Printing media are improved if they resist curl and remain flat. This is particularly important with media utilized with the formation with color images. Such media include those utilized for ink jet, thermal dye sublimation imaging, thermal wax dye transfers and electrophotography. The formation of a flat base is particularly important for color photographic paper. In color papers there is a need for providing color papers with improved curl. Present color papers will curl during development and storage. Such curl is thought to be caused by the different properties of the layers of the color paper as it is subjected to the developing and drying processes. Humidity changes during storage of color photographs lead to curling. There are particular problems with color papers when they are subjected to extended high humidity storage such as at greater than 50% relative humidity. Extremely low humidity of less than 20% relative humidity also will cause photographic papers to curl.

Curl values are the measurement amount of deflection in a parabolically deformed sample. An 8.5 cm diameter round sample of the composite is stored at the test humidity for 21 days. The amount of time required depends on the vapor barrier properties of the laminates applied to the moisture sensitive paper base, and it should be adjusted as necessary by determining the time to equilibrate the weight of the sample in the test humidity. The curl readings are expressed in ANSI curl units, specifically 100 divided by the radius of curvature in centimeters.

The radius of curvature is determined by visually comparing the curled shape, sighting along the axis of curl, with standard curves in the background. The curl may be positive or negative, and for photographic products, the usual convention is that the positive direction is curling towards the photosensitive layer. It would be desirable if the humidity curl for photographic print paper could be reduced.

Color print papers are usually made of three structural layers under the emulsion; raw paper base and a top and bottom coating of extrusion cast polyethylene. Since the strength properties of polyethylene in this form are poor in comparison to the raw base, the curl properties or the stiffness of a print in bending are determined almost exclusively by the raw base. Because of the alignment of the paper fibers during manufacturing, the raw base is highly oriented with respect to strength properties in the plane of the sheet, for example, the ratio of the elastic modulus in the strongest to weakest direction is often 2:1, with the strongest direction in the MD (machine direction). This is why the shape of a typical polyethylene sample with curl, caused by resisting emulsion shrinkage on one surface at low humidity, is cylindrical with the axis of curl along the MD, so the sample curls in its weakest direction, or directly in the CD (cross direction).

It has been proposed in U.S. Pat No. 5,866,282 (Bourdelais et al) to utilize a composite support material with laminated biaxially oriented polyolefin sheets as a photographic imaging material. In U.S. Pat No. 5,866,282, biaxially oriented polyolefin sheets are extrusion laminated to the top and bottom sides of a base material to create a support for silver halide imaging layers. The biaxially oriented sheets described in U.S. Pat. No. 5,866,282 have a microvoided layer in combination with coextruded layers that contain white pigments. The composite imaging support structure described in U.S. Pat. No. 5,866,282 has been found to be more durable, and more tear resistant, sharper and provide brighter reflective images than prior art photographic paper imaging supports that use cast melt extruded polyethylene layers coated on cellulose paper. During the lamination process, in which the biaxially oriented sheets are adhered to the base materials, the biaxially oriented sheets can be heated or cooled prior to lamination. Heating or cooling prior to lamination causes dimensional changes of the biaxially oriented sheet that return to the original dimension after the biaxially oriented sheet have returned to ambient temperature.

It has been proposed in U.S. Pat. No. 5,244,861 to utilize biaxially oriented polypropylene laminated to a base paper for use as a reflective imaging receiver for thermal dye transfer imaging. While the invention does provide an excellent material for the thermal dye transfer imaging process, this invention cannot be used for imaging systems that are gelatin based, such as silver halide and ink jet, because of the sensitivity of the gel imaging systems to humidity. The humidity sensitivity of the gelatin imaging layer creates unwanted imaging element curl. One factor contributing to the imaging element curl is the ratio of base paper stiffness in the machine direction to the cross direction. Traditional photographic base papers have a machine direction to cross direction stiffness ratio, as measured by Young's modulus ratio, of approximately 2.0. For a composite photographic material with biaxially oriented polyolefin sheets laminated to a base paper, it would be desirable if the machine direction to cross direction stiffness ratio for the paper were approximately 1.6 to reduce imaging element curl.

PROBLEM TO BE SOLVED BY THE INVENTION

There remains a need for a base substrate for printing and for photographic use that will resist curl and maintain printed images flat after processing and in storage. There is a particular need for a substrate that resists changes in planer orientation during humidity changes during the lifetime of the print material.

SUMMARY OF THE INVENTION

It is an object of the invention to provide improved printing materials.

It is a further object to provide printing materials that have resistance to curl during humidity changes.

It is an object of the invention to provide a method of curl control when assembling a composite structure when high strength sheets are not exactly similar in their modulus or thickness.

It is a further object to provide a method of adjusting the curl of an assembled composite structure at the time of assembly that does not require tension control.

These and other objects of the invention are accomplished by an imaging member comprising a base wherein said base comprises at least one layer of heat shrinkable sheet and at least one strength layer.

ADVANTAGEOUS EFFECT OF THE INVENTION

The invention provides a method of producing improved imaging elements that resist curling under a variety of conditions. It particularly provides a technique to control the curl of a composite structure at the time of manufacture.

DETAILED DESCRIPTION OF THE INVENTION

Figure 1:
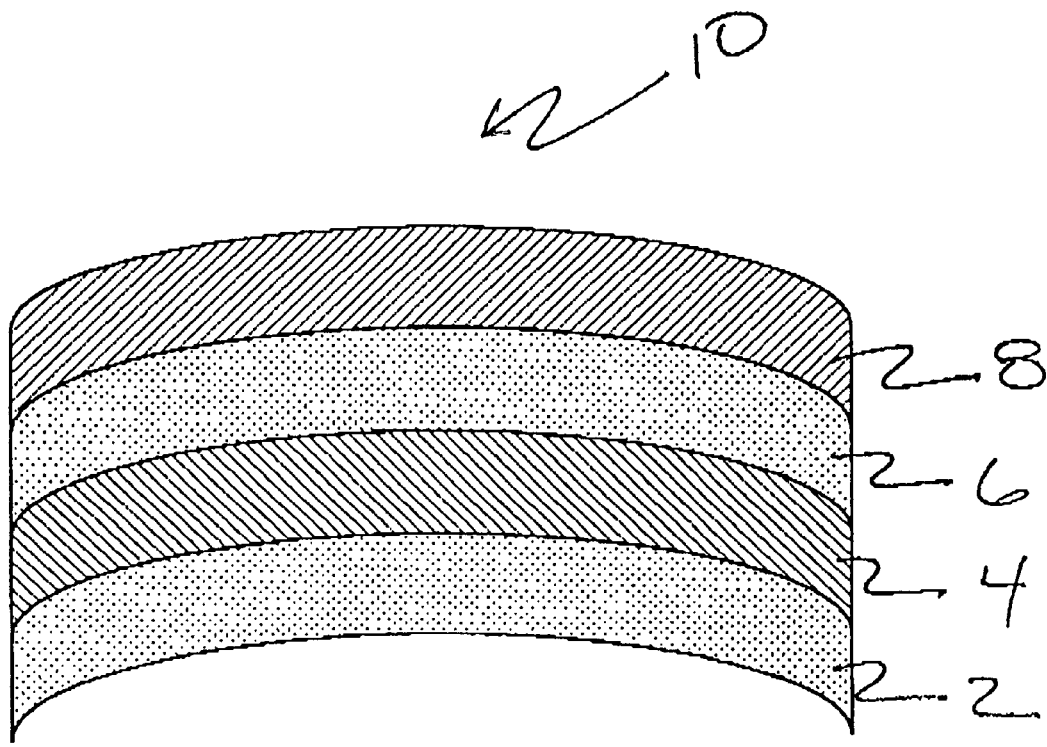
FIG. 1 is a cross section of the imaging member of the invention.

The invention has numerous advantages over prior practices in the art. The imaging members of the invention may be thin, as the balancing of forces uses thin, strong polymer layers. The imaging members of the invention are more pleasing to the viewer of the image as the image is flat and, therefore, does not have undesirable reflections and distortions caused by viewing of a curled image. The imaging material of the invention further has the advantage that it is easier to process as curling does not occur. Curling can lead to transport difficulties and jamming of the machines required for developing, transporting, and packaging of image material. The photographic paper if curled during the imaging step will result in distorted and out of focus images. This invention provides a method for the control of image curl of the imaging element at the time of manufacture. This allows a variety of products to be manufactured from one design rather than changes in materials that are typical of prior art materials. The laminated imaging base in this invention also has an advantage in the easier feeding of image base material into printers of the electrophotographic, thermal dye transfer, and ink jet printers, as imaging element curl will cause paper path jams and reduce the equipment productivity.

The invention provides a method for producing images that are non-planer for use in applications were a flat, planner images are not useful. An example of a non planer image is an image that can be wrapped around a cylinder such as a coffee mug or a column. The invention provides a low cost, effective method of producing curvature in an image without the need for a secondary mechanical constraint. Further, images with curvature allow for radial viewing of an image especially with panoramic images were the length of the image is at least 3 times the width of the image. These and other advantages will be apparent from the detailed description below.

The invention is accomplished by providing at least one layer shrinkable sheet and at least one strength layer. The heat shrinkable sheet changes dimension in one or more dimensions when exposed to heat. By providing a heat shrinkable sheet in combination with a strength layer, the magnitude and direction of the curl of the imaging base can be altered before or after the imaging layers have been applied to the base of the invention. For example, in the formation of photographic papers, a factor to consider in formation of a curl resistant product is the properties of the emulsion layers that are placed onto the base. The emulsion layers apply forces to the paper base as they expand and shrink in response to humidity changes. The emulsion as it dried after formation shrinks tending to curl the paper bearing the emulsion layer inward, particularly at normal usage conditions at low humidity. By providing a heat shrinkable film opposite of the photosensitive imaging layers, the heat shrinkable films can offset the curl forces of the gelatin, thereby yielding an image that is generally flat. Prior art photographic materials utilize low strength melt extruded polyethylene which is not sufficiently strong enough to bend the support.

Preferred imaging layers include one layer of photosensitive silver halide, ink jet receiving layer, thermal dye transfer receiving layer, electrophotographic receiving layer or a lithographic ink receiving layer. By combining imaging layers and a base whose form can be adjusted by heat the flatness and shape of an image can be controlled. For example, controlling the flatness of an ink jet printing paper prior to printing in ink jet printing equipment allows for improved transport efficiency compared to ink jet paper that has curl toward or away from the imaging layers. It has been shown that ink jet paper with excessive curl toward or away from the imaging layers suffers from picking and transport problems in ink jet printers. Further, consumers prefer flat ink jet images compared to images that have curl.

Biaxially oriented polymer sheets are the preferred heat shrinkable sheet. The biaxially oriented sheets on the top and bottom of the base are chosen such that they, together with the base itself, resist bending under a variety of humidity conditions. A preferred core material is cellulose paper. Cellulose paper is relatively inexpensive and has a high mechanical modulus which creates a perceptually preferred stiff photographic member. Biaxially oriented sheets are particularly suitable for resisting bending of the base paper, as they may be engineered during their formation to have selected properties in both the machine and cross direction. This is a result of their being stretched in both directions during formation. For instance, greater stretching in the cross direction during formation of a biaxially oriented sheet will result in a sheet that is stronger in the cross machine direction. Such a polymer sheet, when combined with paper that is weaker in the cross direction, will form a sheet with combined forces that have a strong tendency to keep the laminated sheet flat.

The strength layer in the present invention allows the base to retain the form after the heat shrink layer has changed dimension. The preferred stiffness of the strength layer is greater than 100 millinewtons. Strength layers with stiffness less than 80 millinewtons do not offer the required stiffness to the retain the final dimensional form. Further, strength layer stiffness less than 70 millinewtons has been shown to reduce the conveyance efficiency in printing hardware such as ink jet printers, thermal printers and silver halide printers, were web paths tend to rely on edge guidance. An imaging member comprising a strength layer with a stiffness less than 800 millinewtons is also preferred. At strength layer stiffnesses greater than 900 millinewtons, the imaging member of the invention suffers from conveyance problems as the web must typically bend around roller and in the case of silver halide imaging layers, must be punched and chopped in photofinishing equipment.

The preferred strength layer has an elastic modulus greater than 600 MPa. The elastic modulus of the strength layer is important to the stiffness of the imaging element.

Strength layers modulus less than 500 MPa result in image members that are low in stiffness and do not match consumer expectations for a high quality image as images are viewed, stored and displayed. Further, strength layer modulus less than 500 Mpa result in image members that are difficult to convey through printing equipment. The most preferred elastic modulus for the strength layer is between 600 and 3,500 MPa. Strength layers that have an elastic modulus greater than 4,000 MPa have been found to be difficult to punch and chop during photographic processing of silver halide images.

The strength layer preferably comprises cellulose paper. Cellulose paper is preferred as cellulose paper is low in cost compared to polymer alternatives. Further, cellulose paper is light in weight and has acceptable opacity as the air voids in a cellulose paper sheet provide opacity without the expensive need for white pigments such as $TiO_2$ and calcium carbonate. Examples of suitable cellulose papers for a strength layer member are those disclosed in U.S. Pat. Nos. 5,244,861; 5,866,282; 5,290,672; and 5,466,519.

Another preferred strength layer comprises a polymer. A polymer strength layer is typically smooth resulting in a high quality glossy image. Further, addenda may be added to the polymer strength layer to improve the sharpness and whiteness of the image and the opacity of a photographic image or ink jet image. Addenda such as white pigments to improve the density minimum areas of the image, optical brightener to prove a blue tint to the density minimum areas and blue tint to off set the native yellowness of the gelatin utilized in the silver halide imaging members. Examples of suitable polymers for a strength layer are those disclosed in U.S. Pat. Nos. 4,912,333; 4,994,312; 5,055,371; and 4,187,133.

The strength layer member preferably comprises a composite structure that includes both a cellulose paper and polymer coatings and or sheets applied to the surface of the cellulose paper. A strength layer composite structure consisting of a cellulose paper base and a polymer allows for a low cost, high quality strength layer as this combination allows for the use of low cost of cellulose paper to be used in combination with the desirable performance characteristics of a polymer coating or sheet. Examples of suitable cellulose paper, polymer combinations for a strength layer are those disclosed in U.S. Pat. Nos. 5,866,282; 5,874,205; 5,888,681; and 5,466,519.

The strength layer of the invention provides the imaging member with stiffness and strength during the image formation process and during the viewing of images by consumers. In order to change the dimensions of the image, the imaging member comprises a heat shrinkable sheet. The measurement of the thermal expansion coefficient, having the units of mm/mm-degrees C., is useful in that it measures the ability of a film to change dimension with temperature, materials which have a high number will be more suitable for the purpose of controlling curl with temperature. The dimensional % shrinkage of the heat shrinkable films of the invention is measured using testing procedure ASTM D1204.

The heat shrinkable sheet of the invention provides the means to change the dimension of the imaging member by application of heat to the heat shrinkable sheet. Preferably the heat shrinkable sheet shrinks greater than 5%. A heat shrinkable sheet that shrinks less than 4% does not provide enough dimensional change to offset the humidity curl caused by the contraction of gelatin commonly used in imaging layers. The most preferred heat shrinkable sheet shrinks by an amount between 15% and 30%. It has been found that between 15% and 30% shrink, the imaging member can change dimension to offset curl before or after the imaging process and provide consumers a relatively flat print which is perceptually preferred to images with curl. Further, the heat shrinkable sheet that shrinks between 15% and 30% provides enough curl to allow an imaging member stand up on end for an arcuate view of the image. The imaging member may shrink in the machine direction, the cross direction, or both directions. The direction of the shrinkage is dependant of the residual forces that are present in the heat shrinkable film prior to application of heat to change dimension of the imaging element.

The imaging member of the invention comprises a strength layer and a heat shrinkable sheer. Illustrated in FIG. 1 is a cross section of an imaging member 10 of the invention that has curl away from the imaging member. Imaging layer 8 is applied to strength layer 6. Strength layer 6 is adhesively adhered to heat shrinkable member 2 with adhesive layer 4. Heat has been applied to imaging member 10 and, thus, the curl of imaging member 10 is away from the imaging layer.

When an imaging member of the invention bends under load, as in the deflection of the heat shrinkable sheet of the invention, all points of the elastic curve except those over the supports are deflected from their original positions. The radius of curvature of the imaging member is expressed as; $p=(EI)/(M)$ where p is the radius of curvature of the imaging member, E is the modulus of elasticity of the imaging member 10, I is the moment of inertia of the imaging member 10, and M is the bending moment of the imaging member 10.

Figure 2:
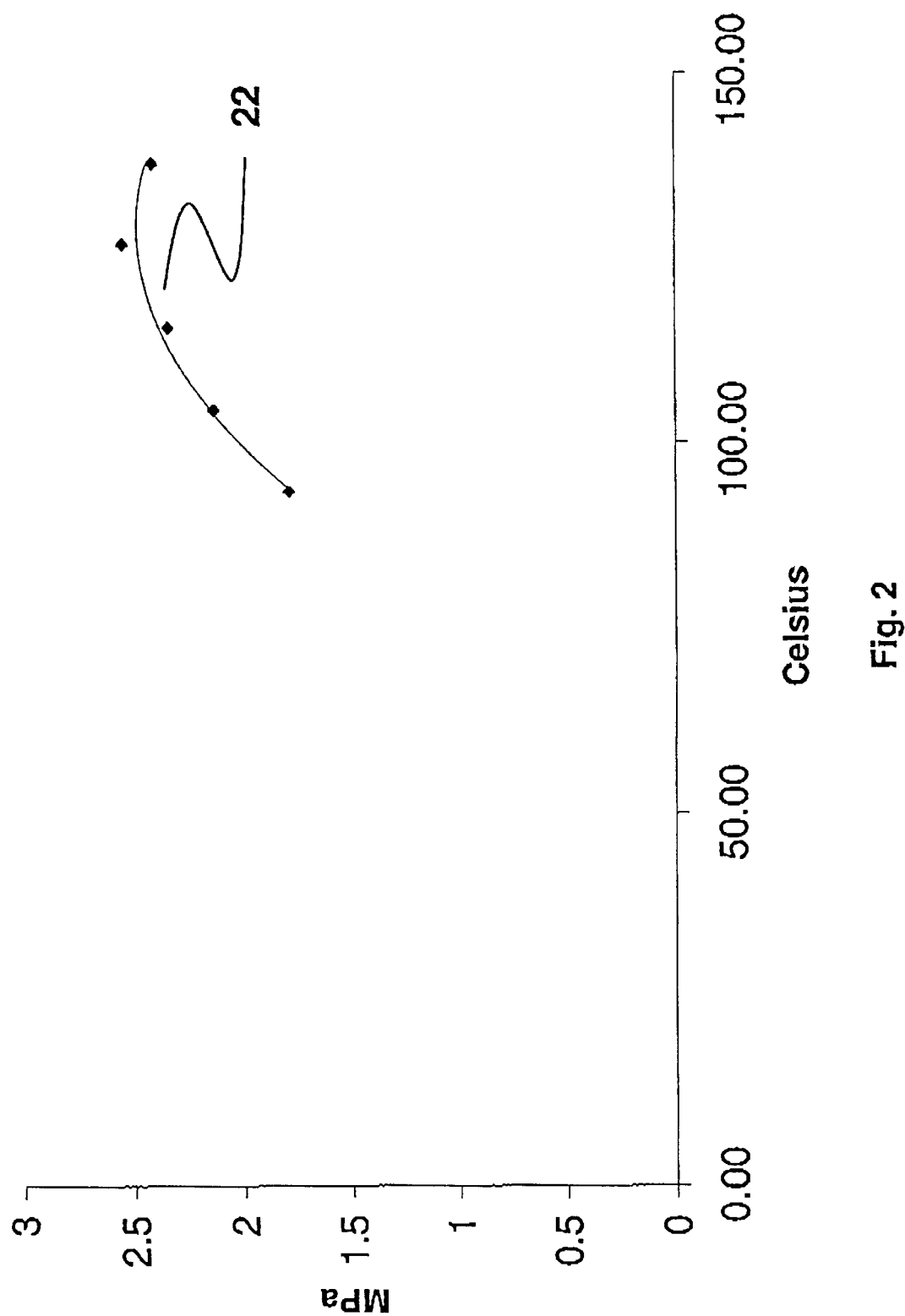
FIG. 2 is a graph of shrink tension of the heat shrinkable sheet as a function of temperature applied to the heat shrinkable sheet.

Illustrated in FIG. 2 is a graph of shrink tension of a heat shrinkable sheet as a function of temperature applied to the heat shrinkable sheet. The vertical axis of FIG. 2 is tension expressed in MPa, and the horizontal axis of FIG. 2 is temperature applied to the heat shrinkable sheet expressed in degrees Celsius. Curve 22 is the relationship between the temperature applied to the heat shrinkable sheet and the shrink tension. Shrink tension in FIG. 2 increases with temperature until the residual forces in the heat shrinkable sheet approach zero. Thus, the curve tends for the heat shrinkable sheet tends to be asymptotic.

Figure 3:
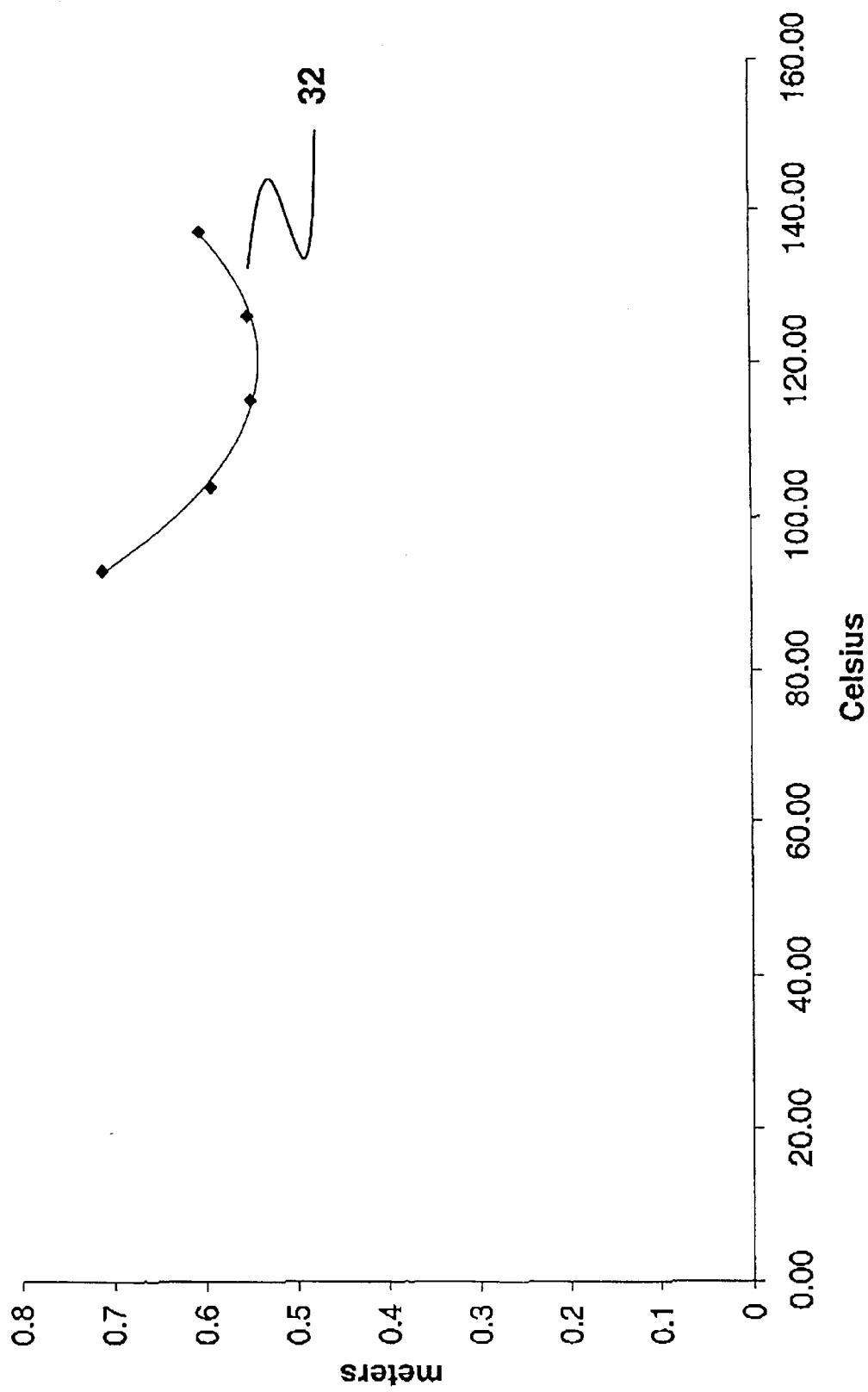
FIG. 3 is a graph of the radius of curvature of an imaging member of the invention as a function of temperature applied to the heat shrinkable sheet.

Illustrated in FIG. 3 is a graph of the radius of curvature of an imaging member of the invention as a function of temperature applied to the heat shrinkable sheet of the invention. The vertical axis is radius of curvature of the imaging element and is expressed in meters. The horizontal axis is the temperature applied to the heat shrinkable sheet of the invention and is expressed in terms of degree Celsius. Curve 32 is the relationship between the radius of curvature and the temperature applied to the heat shrinkable sheet. Imaging member curl is inversely proportional to the radius of curvature, thus, as the radius of curvature gets smaller, the curl of the imaging element increases.

The preferred shrink tension of the heat shrinkable sheet is between 70 and 3800 MPa. Shrink tension is measured utilizing test method ASTM D-2838 and is the tensile force caused by the shrinking of the heat shrinkable sheet. Shrink tension below 50 MPa, the tension forces exerted on the strength layer are insufficient to perceptually change the shape of the image element. Shrink tension of the heat shrinkable sheet above 4250 MPa is difficult to manufacture, as orientation ratio required for a 4250 MPa shrink tension is not cost effective.

The heat shrinkable sheet is preferable located adjacent to the image layer. Locating the heat shrinkable sheet adjacent to the image layer allows for the imaging member to curl toward the image. In another embodiment, the heat shrinkable sheet is located below the strength layer, towards the back side of the imaging member. By locating the heat shrinkable sheet below the strength layer, the imaging member can curl away from the image allowing the imaging member to offset the curl caused by the contraction of gelatin imaging systems. In order for the heat shrink film to exert force on the strength layer, the heat shrink film of the invention is preferably adhesively attached to the strength member. A preferred method of adhering the strength layer to the heat shrinkable sheet is by use of an adhesive. The adhesive preferably is coated or applied to the strength layer. The adhesive preferably is a pressure sensitive adhesive or heat activated adhesive. During the bonding process, the strength layer is applied to the heat shrink layer by use of a nip roller or a heated nip roll in the case of a heat activated adhesive. A preferred pressure sensitive adhesive is an acrylic based adhesive. Acrylic adhesives have been shown to provide an excellent bond that survives the rigors of a chemical development process that are required to develop silver halide imaging layers.

In another preferred embodiment of the invention, the heat shrinkable sheet is located above and below the strength layer. By locating a heat shrinkable sheet above and below the strength layer, the heat shrinkable polymer sheets, after exposure to heat, will apply a uniform compressive force of the strength layer resulting in the stiffness of the strength layer to increase. The heat source for the heat shrinkable sheet applied above and below the strength layer may be applied to either the top sheet or the bottom sheet or the top and bottom sheets simultaneously. Stiff strength layers are preferred by consumers as consumers associate quality with stiff imaging members. Further, by compressing a low cost strength layer, such as cellulose paper, parallel with the image layers, a low cost strength layer stiffness an be improved, resulting in a high quality, low cost imaging element.

Another preferred method of adhesively connecting the strength layer to the heat shrinkable layer is by extrusion lamination. Extrusion lamination is preferred particularly when a cellulose paper strength layer is used. A composite structure consisting of a cellulose paper base and a heat shrinkable layer allows for the use of low cost of cellulose paper to be used in combination as the extruded polymer tends to reduce the roughness of the paper by smoothing the rough surface of the paper. Examples of extrusion lamination are those disclosed in U.S. Pat. Nos. 5,866,282; 5,874,205; 5,888,681; and 5,466,519.

To improve the flatness of an image, the properties of the strength layer and the image layers need to be determined and the properties of the heat shrink film need to be specified to achieve balanced forces to resist image curl. This selection process is generally carried out by mathematical modeling. In a simple case, where the image element is relatively balanced on each side, the center of bending is assumed to be at the geometric center of the image element, and the contribution of each distinct layer to bending stiffness is calculated from the modulus times the moment of inertia of a unit cross section. The moment of inertia of the layers off center must be corrected by the use of the parallel axis theory. The mechanical bending forces are mathematically applied against the stiffness of the image element to determine the amount of curl using beam bending theory. In the case of unbalanced designs, where the center of bending is not known, or where an extremely accurate solution is required for nonlinear materials, nonlinear finite element analysis can be used.

Heat shrinkable sheets of the invention have a high shrinkage capacity compared with prior art biaxially oriented sheets used for imaging support materials. They give a significantly improved shrink % due to the isotropic shrink properties and the increased shrinkage at elevated temperature. The uniform shrinkage in the longitudinal and transverse directions, even at elevated temperature (about 120° C.), makes an essential contribution to the imaging member. Generally, the ratio between the transverse shrinkage and the longitudinal shrinkage at a particular temperature is at most about 2.5. The directional shrink ratio is preferably in the range from about 2 to 0.5, more preferably in the range from about 2 to 1.

For the purposes of the present invention, mixtures are defined as mechanical mixtures prepared from the individual components. For the purposes of the present invention, a blend is an alloy-like compound of the individual components, which cannot be re-separated into the original constituents. A blend has similar properties to a homogeneous material and can be characterized correspondingly by suitable parameters. Heat shrinkable sheets according to the invention prepared from a mixture of polymers are characterized by a less homogenous appearance than heat shrinkable sheets prepared from polymer blends.

The heat shrinkable polymer sheets of the invention comprise a base layer of polymer and may comprise additional polymers layers. An example of a heat shrinkable sheet with a base layer and an additional layer would be a base layer of polypropylene with an integral emulsion adhesion layer of polyethylene. The base layer of the multilayer heat shrinkable sheet according to the present invention comprises a propylene polymer or a propylene polymer mixture. For the purposes of the present invention, a propylene polymer or a propylene polymer mixture is defined as a copolymer or terpolymer of $\alpha$-olefins having 2 to 8 carbon atoms, particularly copolymers or terpolymers of propylene or a mixture of said polymers. Preferred $\alpha$-olefinic copolymers or terpolymers are copolymers of ethylene-propylene or propylene-butylene units or terpolymers of propylene. Particular preference is given to ethylene-propylene copolymers having an ethylene content of about 10% by weight or less and ethylene-propylene-butylene terpolymers having an ethylene content of about 1 to 7% by weight and a butylene content of about 4 to 10% by weight and a propylene content of about 83 to 95% by weight. The data in % by weight relate to the particular copolymer or terpolymer. In addition, mixtures of two or more of the above-mentioned olefinic polymers are suitable, for example, mixtures of said propylene copolymers, such as ethylene-propylene copolymers, with said propylene terpolymers, such as ethylene-propylene-butylene terpolymers.

The copolymers and/or terpolymers in the base layer have a melting point in the range of about 100° C. to 150° C., preferably from about 120° C. to 135° C., and a melt flow index in the range from about 0.5 to 10 g/10 min, preferably about from 2 to 8 g/10 min (DIN 53 735). The base layer composition may also contain, if desired, small amounts of propylene homopolymer, but these amounts must be kept small enough that the high-shrinkage capacity of the sheet is not impaired. In general, the proportion of homopolymer (if present) is less than 10% by weight, preferably less than 5% by weight, based on the weight of the base layer. The homopolymers employed are, where appropriate, fundamentally the same as described below for the outer layer. In addition, the base layer may contain effective amounts of additives, preferably antistatics and/or lubricants.

The heat shrinkable sheet according to the invention has an essentially transparent base layer, i.e. one that does not contain vacuoles. A measure of the degree of degradation of the polymer is the degradation factor A, which gives the relative change in the melt flow index, measured in accordance with DIN 53 735, of the polypropylene, based on the starting polymer.

Particularly preferred organic peroxides are dialkyl peroxides, where the term alkyl radical is defined as a conventional saturated, straight-chain or branched lower alkyl radical having up to six carbon atoms. Particular preference is given to 2,5-dimethyl-2,5-di(t-butylperoxy) hexane and di-t-butyl peroxide. The base layer of the heat shrinkable sheet according to the invention can additionally contain a resin, generally in an amount from about 1 to 20% by weight, preferably from about 1 to 10% by weight, more preferably from about 1 to 5% by weight, based on the weight of the base layer. Preferred resins are low-molecular-weight resins, particularly hydrocarbon resins. The hydrocarbon resins may be partially or fully hydrogenated. Suitable resins are basically synthetic resins or resins of natural origin. It has proven particularly advantageous to employ resins having a softening point of about 0.80° C. (measured in accordance with DIN 1 995-U4 or ASTM E-28), preferably those having a softening point from about 100° to 180° C., more preferably from about 120° C. to 160° C. The resin is preferably incorporated into the heat shrinkable sheet in the form of a masterbatch, which is introduced into the extruder (for example, a single-screw or cascade extruder). Examples of conventional masterbatches are those containing from about 30 to 70% by weight, preferably about 50% by weight, of propylene copolymer and/or terpolymer and from about 70 to 30% by weight, preferably about 50% by weight, of hydrocarbon resin. The data in % by weight relate to the total weight of propylene polymer and hydrocarbon resin.

Of the numerous resins, hydrocarbon resins are preferred, particularly in the form of petroleum resins, styrene resins, cyclopentadiene resins and terpene resins (these resins are described in Ullmanns Encyklopadie der techn. Chemie [Ullmann's Encyclopedia of Industrial Chemistry], $4^{th}$ Edition, Volume 12, pages 525–555). The petroleum resins are hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular-weight homopolymers of styrene or copolymers of styrene with other monomers such as methylstyrene, vinyltoluene, and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for long periods of time. Depending on the reaction temperature, dimers, trimers or oligomers can be obtained.

The terpene resins are polymers of terpenes, i.e., hydrocarbons of the formula $Cl_0 H_{16}$, which are present in virtually all essential oils or oil-containing resins from plants. The terpene resins are also phenol-modified terpene resins. Specific examples of terpenes which may be mentioned are pinene, α-pinene, dipentene, limonene, myrcene, camphene and similar terpenes. Hydrocarbon resins employed are also styrene homopolymers, styrene copolymers, cyclopentadiene homopolymers, cyclopentadiene copolymers and/or terpene polymers. These hydrocarbon resins have a softening point above about 100° C. (in the case of unsaturated polymers, the hydrogenated product is preferred). Particular preference is given to cyclopentadiene polymers having a softening point of about 140° C. or above in the base layer. The hydrocarbon resins can also be so-called modified hydrocarbon resins. The modification is generally carried out by reaction of the raw materials before the polymerization, by the introduction of specific monomers, or by reaction of the polymerized product, particularly by hydrogenation or partial hydrogenation.

In order to further improve specific properties of the polypropylene heat shrinkable sheet according to the present invention, both the base layer and the outer layer(s) may further contain an effective amount of additives. Preferred additives are antiblocking agents and/or stabilizers and/or neutralizers and/or lubricants and/or antistatics which are compatible with the polymers of the base layer and of the outer layer(s), with the exception of antiblocking agents which are generally incompatible. All amount data hereinafter is in percent by weight (% by weight) and in each case relate to the layer or layers to which the additive can be added.

Suitable antiblocking agents for the heat shrinkable sheet are inorganic additives such as silicon dioxide, calcium carbonate, silicate, calcium phosphate, and the like and/or incompatible organic polymers such as polyamides, polyesters, polycarbonates, and the like. Preference is given to benzoguanamine-formaldehyde polymers, silicon dioxide, and calcium carbonate. The effective amount of antiblocking agent is in the range from about 0.1 to 2% by weight, preferably from about 0.1 to 0.5% by weight. The mean particle size is between about 1 and 6 μm, preferably between about 2 and 5 μm. Particles having a spherical shape, as described in EP-A-0 236 945 and DE-A-38 01 535, are particularly suitable. The antiblocking agents are preferably added to the outer layers.

Stabilizers which can be utilized in the heat shrinkable sheet are conventional compounds which have a stabilizing action for polymers of ethylene, propylene and other α-olefins. Their added amount is between about 0.05 and 2% by weight. Particularly suitable are phenolic stabilizers, alkali metal or alkaline earth metal stearates, hindered amines light stabilizers and/or alkali metal or alkaline earth metal carbonates. Phenolic stabilizers are preferred in an amount from about 0.1 to 0.6% by weight, preferably from about 0.15 to 0.3% by weight, and have a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl) benzene are particularly advantageous.

Neutralizers for the heat shrinkable sheet are preferably calcium stearate and/or calcium carbonate having a mean particle size of at most about 0.7 μm, an absolute particle size of less than about 10 μm, and a specific surface area of at least about 40 m²/g. Lubricants are higher aliphatic acid amides, higher aliphatic acid esters, waxes and metal soaps and polydimethylsiloxanes. The effective amount of lubricant is in the range from about 0.01 to 3% by weight. Particularly suitable is the addition of higher aliphatic acid amides in the range from about 0.05 to 0.25% by weight in the base layer and/or the outer layers. A particularly suitable aliphatic acid amide is erucamide. The addition of polydimethylsiloxanes is preferably in the range from about 0.1 to 2.0% by weight. Polydimethylsiloxanes having a viscosity from about 10,000 to 1,000,000 mm²/s are especially preferred.

The addition of antistatic materials into the heat shrinkable sheet is preferred, as static fog or the premature exposure of the light sensitive silver halide imaging layers has been shown to be eliminated by the use of an incorporated antistatic material. Preferred antistatics for the heat shrinkable sheet are alkali metal alkanesulfonates, polyether-modified, i.e., ethoxylated and/or propoxylated polydiorganosiloxanes (polydialkylsiloxanes, polyalkylphenylsiloxanes, and the like) and/or essentially straight-chain and saturated aliphatic, tertiary amines containing an aliphatic radical having 10 to 20 carbon atoms which are substituted by .omega.-hydroxy-($C_1$–$C_4$) alkyl groups. N,N-bis(2-hydroxyethyl)alkylamines having 10 to 20 carbon atoms, preferably 12 to 18 carbon atoms, in the alkyl radical are particularly suitable. The effective amount of antistatic is in the range from about 0.05 to 0.3% by weight. Glycerol monostearate is another preferred as antistatic.

Another aspect of the present invention relates to a process for the production of the multilayer heat shrinkable sheet according to the present invention by the coextrusion process. This process is carried out by coextruding the melts corresponding to the individual layers of the heat shrinkable sheet through a flat-heat shrinkable sheet die, taking off the resultant heat shrinkable sheet over one or more rolls for solidification, subsequently biaxially stretching (orienting) the heat shrinkable sheet, heat-setting the biaxially stretched heat shrinkable sheet and, if desired, corona- or flame-treating the surface layer intended for treatment.

The biaxial stretching (orientation) can be carried out simultaneously or consecutively. Consecutive biaxial stretching, in which stretching is carried out first longitudinally (i.e., in the machine direction) and then transversely (i.e., perpendicular to the machine direction) is preferred. The stretching conditions are selected so that the heat shrinkable sheet has the most balanced orientation possible; it has virtually isotropic, i.e., properties. The temperature during the stretching processes should be selected so that the heat shrinkable sheet has the desired high shrinkage.

As is conventional in coextrusion, the polymer or polymer mixture of the individual layers is compressed and liquefied in an extruder, with it being possible for any additives to be already present in the polymer or polymer mixture or added at this time. The melts are then extruded simultaneously through a flat-heat shrinkable sheet die (slot die), and the extruded multilayer heat shrinkable sheet is drawn off over one or more take-off rolls, where it cools and solidifies. The resultant heat shrinkable sheet is then stretched longitudinally and transversely to the extrusion direction, which results in alignment of the molecule chains. The stretching in the longitudinal direction is preferably from about 4:1 to 9:1, and the stretching in the transverse direction is from about 6:1 to 10:1, preferably from about 6:1 to 8:1. The longitudinal stretching is expediently carried out with the aid of two rolls running at different speeds corresponding to the desired stretching ratio, and the transverse stretching is expediently carried out with the aid of an appropriate tenter frame. This advantageously is not highly stretched in the transverse direction. In order to achieve the shrinkage properties which are essential to the invention, a ratio between the transverse and longitudinal stretching ratios of less than about 2, preferably less than about 1.5, should be maintained. This ratio is preferably in the range from about 0.5 to 1.5.

Biaxial stretching of the heat shrinkable sheet is followed by heat-setting (heat treatment). The heat shrinkable sheet is kept at a temperature of about 400 to 130° C., preferably from about 40° to 100° C. for about 0.5 to 10 seconds. The heat shrinkable sheet is subsequently wound up in the conventional manner by means of a wind-up unit. It has proven advantageous to keep the take-off roll or rolls at a temperature of about from 10° to 100° C., preferably from about 20° to 60° C., by means of a heating and cooling circuit. This serves the purpose of cooling and solidifying the extruded heat shrinkable sheet. The longitudinal stretching is advantageously carried out at a temperature below about 130° C., preferably in the range from about 80° to 120° C. The transverse stretching is advantageously carried out at a temperature of above about 80° C., preferably from about 90° to 140° C.

If desired, one or both surfaces of the heat shrinkable sheet can, as mentioned above, be corona- or flame-treated by one of the known methods after the biaxial stretching. Corona or flame treatment has been shown to improve interlayer adhesion of wound rolls of heat shrinkable film which prevents wound rolls from sliding and telescoping. The treatment intensity is generally in the range from about 38 to 42 mN/m. In the case of corona treatment, an advantageous procedure is to pass the heat shrinkable sheet between two conductor elements serving as electrodes. A high voltage, usually alternating voltage (from about 5 to 20 kV and from about 5 to 30 kHz), is applied between the electrodes so that spray or corona discharges can occur. The spray or corona discharge ionizes the air above the heat shrinkable sheet surface and reacts with the molecules of the surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between about 500 and 3,000 V, preferably in the range from about 1,500 to 2,000 V. The applied voltage gives the ionized atoms increased acceleration, and they hit the polymer surface with greater kinetic energy. The chemical bonds within the polymer molecule are more easily broken, and formation of free radicals proceeds more rapidly.

Since the heat shrinkable sheet is utilized in combination with imaging layers that are oxygen and moisture sensitive, the heat shrinkable films of the invention preferably contain oxygen and moisture barrier properties to improve, for example, gelatin hardening which depends on the moisture gradient between the base and the gelatin imaging layers. The preferred water transmission rate of the heat shrinkable sheet is between 5 and 500 grams/$m^2$/day utilizing test method ASTM F1249. Below 1 gram/$m^2$/day, expensive auxiliary coatings are required to reduce water transmission. Above 600 grams/$m^2$/day little improvement in gelatin hardening has been observed. The preferred oxygen transmission rate of the heat shrinkable sheet is between 2 and 120 cc/$m^2$/day utilizing test method ASTM D1434. Below 1 cc/$m^2$/day, expensive coatings are required to reduce the oxygen transmission rate. Above 150 cc/$m^2$/day, little improvement in dye fade, which is known in the art to be accelerated in the presence of oxygen, has been observed.

In order to change the dimensions of the imaging member, the heat shrinkable sheet attached to the strength layer needs to be heated. A preferred method for heating the imaging member is applied by the use of heated rolls. Heated rolls provide a uniform conductive heat to the imaging member and are particularly useful when the imaging member is in roll form during manufacturing or image processing. The heated rolls may be used to heat one or both sides of the imaging member. Examples include heated rolls at the time of lamination of the strength layer and the heat shrinkable sheet, heated rolls after ink jet printing of the imaging member, and heated rolls after the photographic processing of silver halide images.

Another preferred method of applying heat to the imaging member is applied by the use of heated air. Heated air provides a uniform convection heat transfer and is particularly useful when images are in consumer format. Examples include consumers utilizing heated air to create a 30° arc in an ink jet print to form an image around a coffee mug and consumers using heated air to form a 20° arc in a silver halide panoramic print that stands on edge. A silver halide print with a 20° arc increase the acceptable viewing angle of the image, thus extending the usefulness of the image.

In another preferred embodiment of the invention, heat is applied to the heat shrinkable sheet to form an arcuate member in more than one dimension. By changing the dimension of the heat shrinkable sheet in more than one dimension, images can be formed into spherical shapes that offer consumers an alternate viewing dimension. Further, by creating an arcuate member in more than one dimension, the perception of depth is enhanced compared to a flat, planer image.

As used herein, the phrase "imaging element" is a material that may be used as an imaging support for the transfer of images to the support by techniques such as ink jet printing, thermal dye transfer or electrophotographic printing, as well as a support for silver halide images. As used herein, the phrase "photographic element" is a material that utilizes photosensitive silver halide in the formation of images. The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount which is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803 and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, copiers use imagewise photodischarge through analog or digital exposure of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods. Such as solvent coating, or melt extrusion coating techniques. The DRL is coated over the TL (tie layer) at a thickness ranging from 0.1–10 $\mu$m, preferably 0.5–5 $\mu$m. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese Patents 1,095,091; 2,276,671; 2,276,670; 4,267,180; 5,024,335; and 5,016,517 disclosesaqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. 5,059,983 disclose aqueous-coatable DRL formulations based on poly (vinyl alcohol). Iqbal in U.S. Pat. No. 5,208,092 discloses water-based IRL (ink receiving layer) formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 micrometers DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

An image recording element for ink jet printing comprises a base layer and an image receiving layer coated onto a base consisting of a strength layer and a heat shrinkable sheet. For the base layer, a mixture of 60% by weight lime-process ossein photographic grade gelatin, 30% by weight of poly-vinylpyrrolidone (PVP K-90, ISP) and 10% by weight of Mordant 1 was prepared. Mordant 1 consists of a polymer prepared from (vinylbenzyl)trimethylammonium chloride and divinylbenzene as described in U.S. Pat. No. 6,045,917 of Missell et al. The pH of the mixture was adjusted to 3.5 by addition of hydrochloric acid (36–38%, JT Baker). Some surfactant (Dixie 10 G, Dixie Chemicals) was added to enhance coatability. A 10% coating solution of the mixture was prepared and slot coated onto the support and dried at 100° C. to give a dry coverage of 5.4 g/m$^2$.

For the image receiving layer, a mixture of 80% by weight of hydroxyethyl cellulose (Quatrisoft® LM200, Amerchol) and 20% by weight of methyl cellulose (Methocel® A4M, Dow Chemical) was prepared. Surfactants (Dixie® 10G, Dixie Chemicals and Zonyl® FSN, DuPont) were added to enhance coatability. A 2% coating solution of the mixture was prepared and slot coated onto the base layer and dried at 100° C. to give a dry coverage of 1.1 g/m$^2$.

When the base material with dimensional adjustment by heat is coated with silver halide photographic element, it is capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100 $\mu$ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above.

This invention in a preferred embodiment utilizes a radiation-sensitive emulsion comprised of silver halide grains (a) containing greater than 50 mole percent chloride, based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula $$[ML_6]^n \tag{I}$$

wherein n is zero, −1, −2, −3, or −4; M is a filled frontier orbital polyvalent metal ion, other than iridium; and $L_6$ represents bridging ligands which can be independently selected, provided that least four of the ligands are anionic ligands, and at least one of the ligands is a cyano ligand or a ligand more electronegative than a cyano ligand; and (ii) an iridium coordination complex containing a thiazole or substituted thiazole ligand.

This invention in a preferred embodiment is directed towards a photographic recording element comprising a support and at least one light sensitive silver halide emulsion layer comprising silver halide grains as described above.

It has been discovered quite surprisingly that the combination of dopants (i) and (ii) provides greater reduction in reciprocity law failure than can be achieved with either dopant alone. Further, unexpectedly, the combination of dopants (i) and (ii) achieves reductions in reciprocity law failure beyond the simple additive sum achieved when employing either dopant class by itself. It has not been reported or suggested prior to this invention that the combination of dopants (i) and (ii) provides greater reduction in reciprocity law failure, particularly for high intensity and short duration exposures. The combination of dopants (i) and (ii) further unexpectedly achieves high intensity reciprocity with iridium at relatively low levels, and both high and low intensity reciprocity improvements even while using conventional gelatino-peptizer (e.g., other than low methionine gelatino-peptizer).

In a preferred practical application, the advantages of the invention can be transformed into increased throughput of digital substantially artifact-free color print images while exposing each pixel sequentially in synchronism with the digital data from an image processor.

In one embodiment, the present invention represents an improvement on the electronic printing method. Specifically, this invention in one embodiment is directed to an electronic printing method which comprises subjecting a radiation sensitive silver halide emulsion layer of a recording element to actinic radiation of at least $10^{-4}$ ergs/cm$^2$ for up to 100 $\mu$ seconds duration in a pixel-by-pixel mode. The present invention realizes an improvement in reciprocity failure by selection of the radiation sensitive silver halide emulsion layer. While certain embodiments of the invention are specifically directed towards electronic printing, use of the emulsions and elements of the invention is not limited to such specific embodiment, and it is specifically contemplated that the emulsions and elements of the invention are also well suited for conventional optical printing.

It has been unexpectedly discovered that significantly improved reciprocity performance can be obtained for silver halide grains (a) containing greater than 50 mole percent chloride, based on silver, and (b) having greater than 50 percent of their surface area provided by {100} crystal faces by employing a hexacoordination complex dopant of class (i) in combination with an iridium complex dopant comprising a thiazole or substituted thiazole ligand. The reciprocity improvement is obtained for silver halide grains employing conventional gelatino-peptizer, unlike the contrast improvement described for the combination of dopants set forth in U.S. Pat. Nos. 5,783,373 and 5,783,378, which requires the use of low methionine gelatino-peptizers as discussed therein, and which states it is preferable to limit the concentration of any gelatino-peptizer with a methionine level of greater than 30 micromoles per gram to a concentration of less than 1 percent of the total peptizer employed. Accordingly, in specific embodiments of the invention, it is specifically contemplated to use significant levels (i.e., greater than 1 weight percent of total peptizer) of conventional gelatin (e.g., gelatin having at least 30 micromoles of methionine per gram) as a gelatino-peptizer for the silver halide grains of the emulsions of the invention. In preferred embodiments of the invention, gelatino-peptizer is employed which comprises at least 50 weight percent of gelatin containing at least 30 micromoles of methionine per gram, as it is frequently desirable to limit the level of oxidized low methionine gelatin which may be used for cost and certain performance reasons.

In a specific, preferred form of the invention it is contemplated to employ a class (i) hexacoordination complex dopant satisfying the formula:

$$[ML_6]^n \qquad (I)$$

where n is zero, −1, −2, −3, or −4;

M is a filled frontier orbital polyvalent metal ion, other than iridium, preferably $Fe^{+2}$, $Ru^{+2}$, $Os^{+2}$, $Co^{+3}$, $Rh^{+3}$, $Pd^{+4}$ or $Pt^{+4}$, more preferably an iron, ruthenium or osmium ion, and most preferably a ruthenium ion;

$L_6$ represents six bridging ligands which can be independently selected, provided that least four of the ligands are anionic ligands and at least one (preferably at least 3 and optimally at least 4) of the ligands is a cyano ligand or a ligand more electronegative than a cyano ligand. Any remaining ligands can be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. Hexacoordinated transition metal complexes of class (i) which include six cyano ligands are specifically preferred.

Illustrations of specifically contemplated class (i) hexacoordination complexes for inclusion in the high chloride grains are provided by Olm et al U.S. Pat. No. 5,503,970 and Daubendiek et al U.S. Pat. Nos. 5,494,789 and 5,503,971, and Keevert et al U.S. Pat. No. 4,945,035, as well as Murakami et al Japanese Patent Application Hei-2[1990]-249588, and *Research Disclosure* Item 36736. Useful neutral and anionic organic ligands for class (ii) dopant hexacoordination complexes are disclosed by Olm et al U.S. Pat. No. 5,360,712 and Kuromoto et al U.S. Pat. No. 5,462,849.

Class (i) dopant is preferably introduced into the high chloride grains after at least 50 (most preferably 75 and optimally 80) percent of the silver has been precipitated, but before precipitation of the central portion of the grains has been completed. Preferably class (i) dopant is introduced before 98 (most preferably 95 and optimally 90) percent of the silver has been precipitated. Stated in terms of the fully precipitated grain structure, class (i) dopant is preferably present in an interior shell region that surrounds at least 50 (most preferably 75 and optimally 80) percent of the silver and, with the more centrally located silver, accounts the entire central portion (99 percent of the silver), most preferably accounts for 95 percent, and optimally accounts for 90 percent of the silver halide forming the high chloride grains. The class (i) dopant can be distributed throughout the interior shell region delimited above or can be added as one or more bands within the interior shell region.

Class (i) dopant can be employed in any conventional useful concentration. A preferred concentration range is from $10^{-8}$ to $10^{-3}$ mole per silver mole, most preferably from $10^{-6}$ to $5 \times 10^{-4}$ mole per silver mole.

The following are specific illustrations of class (i) dopants:

| | |
|---|---|
| $[Fe(CN)_6]^{-4}$ | (i-1) |
| $[Ru(CN)_6]^{-4}$ | (i-2) |
| $[Os(CN)_6]^{-4}$ | (i-3) |
| $[Rh(CN)_6]^{-3}$ | (i-4) |
| $[Co(CN)_6]^{-3}$ | (i-5) |
| $[Fe(pryazine)(CN)_5]^{-4}$ | (i-6) |
| $[RuCl(CN)_5]^{-4}$ | (i-7) |
| $[OsBr(CN)_5]^{-4}$ | (i-8) |
| $[RhF(CN)_5]^{-3}$ | (i-9) |
| $[In(NCS)_6]^{-3}$ | (i-10) |
| $[FeCO(CN)_5]^{-3}$ | (i-11) |
| $[RuF_2(CN)_4]^{-4}$ | (i-12) |
| $[OsCl_2(CN)_4]^{-4}$ | (i-13) |
| $[RhI_2(CN)_4]^{-3}$ | (i-14) |
| $[Ga(NCS)_6]^{-3}$ | (i-15) |
| $[Ru(CN)_5(OCN)]^{-4}$ | (i-16) |
| $[Ru(CN)_5(N_3)]^{-4}$ | (i-17) |
| $[Os(CN)_5(SCN)]^{-4}$ | (i-18) |
| $[Rh(CN)_5(SeCN)]^{-3}$ | (i-19) |
| $[Os(CN)Cl_5]^{-4}$ | (i-20) |
| $[Fe(CN)_3Cl_3]^{-3}$ | (i-21) |
| $[Ru(CO)_2(CN)_4]^{-1}$ | (i-22) |

When the class (i) dopants have a net negative charge, it is appreciated that they are associated with a counter ion when added to the reaction vessel during precipitation. The counter ion is of little importance, since it is ionically dissociated from the dopant in solution and is not incorporated within the grain. Common counter ions known to be fully compatible with silver chloride precipitation, such as ammonium and alkali metal ions, are contemplated. It is noted that the same comments apply to class (ii) dopants, otherwise described below.

The class (ii) dopant is an iridium coordination complex containing at least one thiazole or substituted thiazole ligand. Careful scientific investigations have revealed Group VIII hexahalo coordination complexes to create deep electron traps, as illustrated R. S. Eachus, R. E. Graves and M. T. Olm *J. Chem. Phys.*, Vol. 69, pp. 4580–7 (1978) and *Physica Status Solidi A*, Vol. 57, 429–37 (1980) and R. S. Eachus and M. T. Olm *Annu. Rep. Prog. Chem. Sect. C. Phys. Chem.*, Vol. 83, 3, pp. 3–48 (1986). The class (ii) dopants employed in the practice of this invention are believed to create such deep electron traps. The thiazole ligands may be substituted with any photographically acceptable substituent which does not prevent incorporation of the dopant into the silver halide grain. Exemplary substituents include lower alkyl (e.g., alkyl groups containing 1–4 carbon atoms), and specifically methyl. A specific example of a substituted thiazole ligand which may be used in accordance with the invention is 5-methylthiazole. The class (ii) dopant preferably is an iridium coordination complex having ligands each of which are more electropositive than a cyano ligand. In a specifically preferred form the remaining non-thiazole or non-substituted-thiazole ligands of the coordination complexes forming class (ii) dopants are halide ligands.

It is specifically contemplated to select class (ii) dopants from among the coordination complexes containing organic ligands disclosed by Olm et al U.S. Pat. No. 5,360,712; Olm et al U.S. Pat. No. 5,457,021; and Kuromoto et al U.S. Pat. No. 5,462,849.

In a preferred form it is contemplated to employ as a class (ii) dopant a hexacoordination complex satisfying the formula:

$$[IrL^1_6]^{n'} \quad (II)$$

wherein n' is zero, −1, −2, −3, or −4; and $L^1_6$ represents six bridging ligands which can be independently selected, provided that at least four of the ligands are anionic ligands, each of the ligands is more electropositive than a cyano ligand, and at least one of the ligands comprises a thiazole or substituted thiazole ligand. In a specifically preferred form at least four of the ligands are halide ligands, such as chloride or bromide ligands.

Class (ii) dopant is preferably introduced into the high chloride grains after at least 50 (most preferably 85 and optimally 90) percent of the silver has been precipitated, but before precipitation of the central portion of the grains has been completed. Preferably class (ii) dopant is introduced before 99 (most preferably 97 and optimally 95) percent of the silver has been precipitated. Stated in terms of the fully precipitated grain structure, class (ii) dopant is preferably present in an interior shell region that surrounds at least 50 (most preferably 85 and optimally 90) percent of the silver and, with the more centrally located silver, accounts the entire central portion (99 percent of the silver), most preferably accounts for 97 percent, and optimally accounts for 95 percent of the silver halide forming the high chloride grains. The class (ii) dopant can be distributed throughout the interior shell region delimited above or can be added as one or more bands within the interior shell region.

Class (ii) dopant can be employed in any conventional useful concentration. A preferred concentration range is from $10^{-9}$ to $10^{-4}$ mole per silver mole. Iridium is most preferably employed in a concentration range of from $10^{-8}$ to $10^{-5}$ mole per silver mole.

Specific illustrations of class (ii) dopants are the following:

 (ii-1)

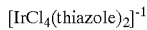 (ii-2)

 (ii-3)

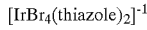 (ii-4)

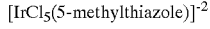 (ii-5)

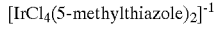 (ii-6)

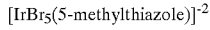 (ii-7)

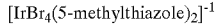 (ii-8)

In one preferred aspect of the invention in a layer using a magenta dye forming coupler, a class (ii) dopant in combination with an $OsCl_5(NO)$ dopant has been found to produce a preferred result.

Emulsions demonstrating the advantages of the invention can be realized by modifying the precipitation of conventional high chloride silver halide grains having predominantly (>50%){100} crystal faces by employing a combination of class (i) and (ii) dopants as described above.

The silver halide grains precipitated contain greater than 50 mole percent chloride, based on silver. Preferably the grains contain at least 70 mole percent chloride and, optimally at least 90 mole percent chloride, based on silver. Iodide can be present in the grains up to its solubility limit, which is in silver iodochloride grains, under typical conditions of precipitation, about 11 mole percent, based on silver. It is preferred for most photographic applications to limit iodide to less than 5 mole percent iodide, most preferably less than 2 mole percent iodide, based on silver.

Silver bromide and silver chloride are miscible in all proportions. Hence, any portion, up to 50 mole percent, of the total halide not accounted for chloride and iodide, can be bromide. For color reflection print (i.e., color paper) uses bromide is typically limited to less than 10 mole percent based on silver, and iodide is limited to less than 1 mole percent based on silver.

In a widely used form high chloride grains are precipitated to form cubic grains—that is, grains having {100} major faces and edges of equal length. In practice ripening effects usually round the edges and comers of the grains to some extent. However, except under extreme ripening conditions substantially more than 50 percent of total grain surface area is accounted for by {100} crystal faces.

High chloride tetradecahedral grains are a common variant of cubic grains. These grains contain 6 {100} crystal faces and 8 {111} crystal faces. Tetradecahedral grains are within the contemplation of this invention to the extent that greater than 50 percent of total surface area is accounted for by {100} crystal faces.

Although it is common practice to avoid or minimize the incorporation of iodide into high chloride grains employed in color paper, it is has been recently observed that silver iodochloride grains with {100} crystal faces and, in some instances, one or more {111} faces offer exceptional levels of photographic speed. In the these emulsions iodide is incorporated in overall concentrations of from 0.05 to 3.0 mole percent, based on silver, with the grains having a surface shell of greater than 50 Å that is substantially free of iodide and a interior shell having a maximum iodide concentration that surrounds a core accounting for at least 50 percent of total silver. Such grain structures are illustrated by Chen et al EPO 0 718 679.

In another improved form the high chloride grains can take the form of tabular grains having {100} major faces. Preferred high chloride {100} tabular grain emulsions are those in which the tabular grains account for at least 70 (most preferably at least 90) percent of total grain projected area. Preferred high chloride {100} tabular grain emulsions have average aspect ratios of at least 5 (most preferably at least >8). Tabular grains typically have thicknesses of less than 0.3 $\mu$m, preferably less than 0.2 $\mu$m, and optimally less than 0.07 $\mu$m. High chloride {100} tabular grain emulsions and their preparation are disclosed by Maskasky U.S. Pat. Nos. 5,264,337 and 5,292,632; House et al U.S. Pat. No. 5,320,938; Brust et al U.S. Pat. No. 5,314,798; and Chang et al U.S. Pat. NO. 5,413,904.

Once high chloride grains having predominantly {100} crystal faces have been precipitated with a combination of class (i) and class (ii) dopants described above, chemical and spectral sensitization, followed by the addition of conventional addenda to adapt the emulsion for the imaging application of choice can take any convenient conventional form. These conventional features are illustrated by *Research Disclosure*, Item 38957, cited above, particularly:

III. Emulsion washing;

IV. Chemical sensitization;

V. Spectral sensitization and desensitization;

VII. Antifoggants and stabilizers;

VIII. Absorbing and scattering materials;

IX. Coating and physical property modifying addenda; and

X. Dye image formers and modifiers.

Some additional silver halide, typically less than 1 percent, based on total silver, can be introduced to facilitate chemical sensitization. It is also recognized that silver halide can be epitaxially deposited at selected sites on a host grain to increase its sensitivity. For example, high chloride {100} tabular grains with comer epitaxy are illustrated by Maskasky U.S. Pat. No. 5,275,930. For the purpose of providing a clear demarcation, the term "silver halide grain" is herein employed to include the silver necessary to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains while silver halide that deposits and provides the final {100 } crystal faces of the grains is included in the total silver forming the grains, even when it differs significantly in composition from the previously precipitated silver halide.

Image dye-forming couplers may be included in the element such as couplers that form cyan dyes upon reaction with oxidized color developing agents which are described in such representative patents and publications as: U.S. Pat. Nos. 2,367,531; 2,423,730; 2,474,293; 2,772,162; 2,895, 826; 3,002,836; 3,034,892; 3,041,236; 4,883,746 and "Farbkuppler - Eine Literature Ubersicht," published in Agfa Mitteilungen, Band III, pp. 156–175 (1961). Preferably such couplers are phenols and naphthols that form cyan dyes on reaction with oxidized color developing agent. Also preferable are the cyan couplers described in, for instance, European Pat. Application Nos. 491,197; 544,322; 556,700; 556,777; 565,096; 570,006; and 574,948.

Typical cyan couplers are represented by the following formulas:

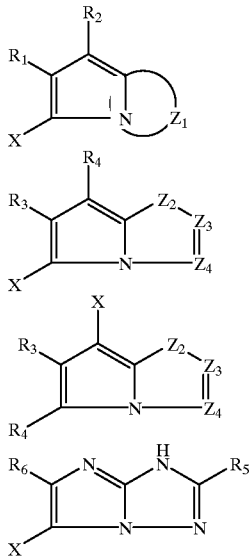

CYAN-1

CYAN-2

CYAN-3

CYAN-4 wherein $R_1$, $R_5$ and $R_8$ each represents a hydrogen or a substituent; $R_2$ represents a substituent; $R_3$, $R_4$ and $R_7$ each represents an electron attractive group having a Hammett's substituent constant σpara of 0.2 or more and the sum of the σpara values of $R_3$ and $R_4$ is 0.65 or more; $R_6$ represents an electron attractive group having a Hammett's substituent constant σpara of 0.35 or more; X represents a hydrogen or a coupling-off group; $Z_1$ represents nonmetallic atoms necessary for forming a nitrogen-containing, six-membered, heterocyclic ring which has at least one dissociative group; $Z_2$ represents —C($R_7$)=and —N=; and $Z_3$ and $Z_4$ each represents —C($R_8$)= and —N=.

For purposes of this invention, an "NB coupler" is a dye-forming coupler which is capable of coupling with the developer 4-amino-3-methyl-N-ethyl-N-(2-methanesulfonamidoethyl) aniline sesquisulfate hydrate to form a dye for which the left bandwidth (LBW) of its absorption spectra upon "spin coating" of a 3% w/v solution of the dye in di-n-butyl sebacate solvent is at least 5 nm. less than the LBW for a 3% w/v solution of the same dye in acetonitrile. The LBW of the spectral curve for a dye is the distance between the left side of the spectral curve and the wavelength of maximum absorption measured at a density of half the maximum.

The "spin coating" sample is prepared by first preparing a solution of the dye in di-n-butyl sebacate solvent (3% w/v). If the dye is insoluble, dissolution is achieved by the addition of some methylene chloride. The solution is filtered and 0.1–0.2 ml is applied to a clear polyethylene terephthalate support (approximately 4 cm×4 cm) and spun at 4,000 RPM using the Spin Coating equipment, Model No. EC 101, available from Headway Research Inc., Garland Tex. The transmission spectra of the so prepared dye samples are then recorded.

Preferred "NB couplers" form a dye which, in n-butyl sebacate, has a LBW of the absorption spectra upon "spin coating" which is at least 15 nm, preferably at least 25 nm, less than that of the same dye in a 3% solution (w/v) in acetonitrile.

In a preferred embodiment the cyan dye-forming "NB coupler" useful in the invention has the formula (IA)

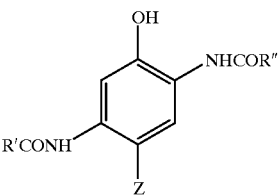

(IA)

wherein

R' and R" are substituents selected such that the coupler is a "NB coupler", as herein defined; and Z is a hydrogen atom or a group which can be split off by the reaction of the coupler with an oxidized color developing agent.

The coupler of formula (IA) is a 2,5-diamido phenolic cyan coupler wherein the substituents R' and R" are preferably independently selected from unsubstituted or substituted alkyl, aryl, amino, alkoxy and heterocyclyl groups.

In a further preferred embodiment, the "NB coupler" has the formula (I):

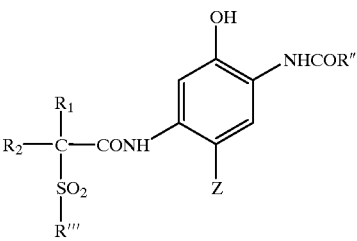

(I)

wherein

R" and R'" are independently selected from unsubstituted or substituted alkyl, aryl, amino, alkoxy and heterocyclyl groups and Z is as hereinbefore defined;

$R_1$ and $R_2$ are independently hydrogen or an unsubstituted or substituted alkyl group; and Typically, R" is an alkyl, amino or aryl group, suitably a phenyl group. R'" is desirably an alkyl or aryl group or a 5–10 membered heterocyclic ring which contains one or more heteroatoms selected from nitrogen, oxygen and sulfur, which ring group is unsubstituted or substituted.

In the preferred embodiment the coupler of formula (I) is a 2,5-diamido phenol in which the 5-amido moiety is an amide of a carboxylic acid which is substituted in the alpha position by a particular sulfone (—$SO_2$—) group, such as, for example, described in U.S. Pat. No. 5,686,235. The sulfone moiety is an unsubstituted or substituted alkylsulfone or a heterocyclyl sulfone or it is an arylsulfone, which is preferably substituted, in particular in the meta and/or para position.

Couplers having these structures of formulae (I) or (IA) comprise cyan dye-forming "NB couplers" which form image dyes having very sharp-cutting dye hues on the short wavelength side of the absorption curves with absorption maxima ($\lambda_{max}$) which are shifted hypsochromically and are generally in the range of 620–645 nm, which is ideally suited for producing excellent color reproduction and high color saturation in color photographic papers.

Referring to formula (I), $R_1$ and $R_2$ are independently hydrogen or an unsubstituted or substituted alkyl group, preferably having from 1 to 24 carbon atoms and in particular 1 to 10 carbon atoms, suitably a methyl, ethyl, n-propyl, isopropyl, butyl or decyl group or an alkyl group substituted with one or more fluoro, chloro or bromo atoms, such as a trifluoromethyl group. Suitably, at least one of $R_1$ and $R_2$ is a hydrogen atom and if only one of $R_1$ and $R_2$ is a hydrogen atom, then the other is preferably an alkyl group having 1 to 4 carbon atoms, more preferably 1 to 3 carbon atoms and desirably two carbon atoms.

As used herein and throughout the specification unless where specifically stated otherwise, the term "alkyl" refers to an unsaturated or saturated straight or branched chain alkyl group, including alkenyl, and includes aralkyl and cyclic alkyl groups, including cycloalkenyl, having 3–8 carbon atoms and the term 'aryl' includes specifically fused aryl.

In formula (I), R" is suitably an unsubstituted or substituted amino, alkyl or aryl group or a 5–10 membered heterocyclic ring which contains one or more heteroatoms selected from nitrogen, oxygen and sulfur, which ring is unsubstituted or substituted, but is more suitably an unsubstituted or substituted phenyl group.

Examples of suitable substituent groups for this aryl or heterocyclic ring include cyano, chloro, fluoro, bromo, iodo, alkyl- or aryl-carbonyl, alkyl- or aryl-oxycarbonyl, carbonamido, alkyl- or aryl-carbonamido, alkyl- or aryl-sulfonyl, alkyl- or aryl-sulfonyloxy, alkyl- or aryl-oxysulfonyl, alkyl- or aryl-sulfoxide, alkyl- or aryl-sulfamoyl, alkyl- or aryl-sulfonamido, aryl, alkyl, alkoxy, aryloxy, nitro, alkyl- or aryl-ureido and alkyl- or aryl-carbamoyl groups, any of which may be further substituted. Preferred groups are halogen, cyano, alkoxycarbonyl, alkylsulfamoyl, alkyl-sulfonamido, alkylsulfonyl, carbamoyl, alkylcarbamoyl or alkylcarbonamido. Suitably, R is a 4-chlorophenyl, 3,4-di-chlorophenyl, 3,4-difluorophenyl, 4-cyanophenyl, 3-chloro-4-cyanophenyl, pentafluorophenyl, or a 3- or 4-sulfonamidophenyl group.

In formula (I) when R'" is alkyl, it may be unsubstituted or substituted with a substituent such as halogen or alkoxy. When R'" is aryl or a heterocycle, it may be substituted. Desirably it is not substituted in the position alpha to the sulfonyl group.

In formula (I), when R'" is a phenyl group, it may be substituted in the meta and/or para positions with one to three substituents independently selected from the group consisting of halogen, and unsubstituted or substituted alkyl, alkoxy, aryloxy, acyloxy, acylamino, alkyl- or aryl-sulfonyloxy, alkyl- or aryl-sulfamoyl, alkyl- or aryl-sulfamoylamino, alkyl- or aryl-sulfonamido, alkyl- or aryl-ureido, alkyl- or aryl-oxycarbonyl, alkyl- or aryl-oxycarbonylamino and alkyl- or aryl-carbamoyl groups.

In particular each substituent may be an alkyl group such as methyl, t-butyl, heptyl, dodecyl, pentadecyl, octadecyl or 1,1,2,2-tetramethylpropyl; an alkoxy group such as methoxy, t-butoxy, octyloxy, dodecyloxy, tetradecyloxy, hexadecyloxy or octadecyloxy; an aryloxy group such as phenoxy, 4-t-butylphenoxy or 4-dodecyl-phenoxy; an alkyl- or aryl-acyloxy group such as acetoxy or dodecanoyloxy; an alkyl- or aryl-acylamino group such as acetamido, hexadecanamido or benzamido; an alkyl- or aryl-sulfonyloxy group such as methyl-sulfonyloxy, dodecylsulfonyloxy or 4-methylphenyl-sulfonyloxy; an alkyl- or aryl-sulfamoyl group such as N-butylsulfamoyl or N-4-t-butylphenylsulfamoyl; an alkyl- or aryl-sulfamoylamino group such as N-butyl-sulfamoylamino or N-4-t-butylphenylsulfamoyl-amino; an alkyl- or aryl-sulfonamido group such as methane-sulfonamido, hexadecanesulfonamido or 4-chlorophenyl-sulfonamido; an alkyl- or aryl-ureido group such as methylureido or phenylureido; an alkoxy- or aryloxy-carbonyl such as methoxycarbonyl or phenoxycarbonyl; an alkoxy- or aryloxy-carbonylamino group such as methoxy-carbonylamino or phenoxycarbonylamino; an alkyl- or aryl-carbamoyl group such as N-butylcarbamoyl or N-methyl-N-dodecylcarbamoyl; or a perfluoroalkyl group such as trifluoromethyl or heptafluoropropyl.

Suitably the above substituent groups have 1 to 30 carbon atoms, more preferably 8 to 20 aliphatic carbon atoms. A desirable substituent is an alkyl group of 12 to 18 aliphatic carbon atoms such as dodecyl, pentadecyl or octadecyl or an alkoxy group with 8 to 18 aliphatic carbon atoms such as dodecyloxy and hexadecyloxy or a halogen such as a meta or para chloro group, carboxy or sulfonamido. Any such groups may contain interrupting heteroatoms such as oxygen to form e.g. polyalkylene oxides.

In formula (I) or (IA), Z is a hydrogen atom or a group which can be split off by the reaction of the coupler with an oxidized color developing agent, known in the photographic art as a 'coupling-off group' and may preferably be hydrogen, chloro, fluoro, substituted aryloxy or mercaptotetrazole, more preferably hydrogen or chloro.

The presence or absence of such groups determines the chemical equivalency of the coupler, i.e., whether it is a 2-equivalent or 4-equivalent coupler, and its particular identity can modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction, and the like.

Representative classes of such coupling-off groups include, for example, halogen, alkoxy, aryloxy, heterocyclyloxy, sulfonyloxy, acyloxy, acyl, heterocyclylsulfonamido, heterocyclylthio, benzothiazolyl, phosophonyloxy, alkylthio, arylthio, and arylazo. These coupling-off groups are described in the art, for example, in U.S. Pat. Nos. 2,455,169; 3,227,551; 3,432,521; 3,467,563; 3,617,291; 3,880,661; 4,052,212; and 4,134,766; and in U.K. Patent Nos. and published applications 1,466,728; 1,531,927; 1,533,039; 2,066,755A, and 2,017,704A. Halogen, alkoxy, and aryloxy groups are most suitable.

Examples of specific coupling-off groups are —Cl, —F, —Br, —SCN, —OCH$_3$, —OC$_6$H$_5$, —OCH$_2$C(=O)NHCH$_2$CH$_2$OH, —OCH$_2$C(O)NHCH$_2$CH$_2$OCH$_3$, —OCH$_2$C(O)NHCH$_2$CH$_2$OC(=O)OCH$_3$, —P(=O)(OC$_2$H$_5$)$_2$, —SCH$_2$CH$_2$COOH,

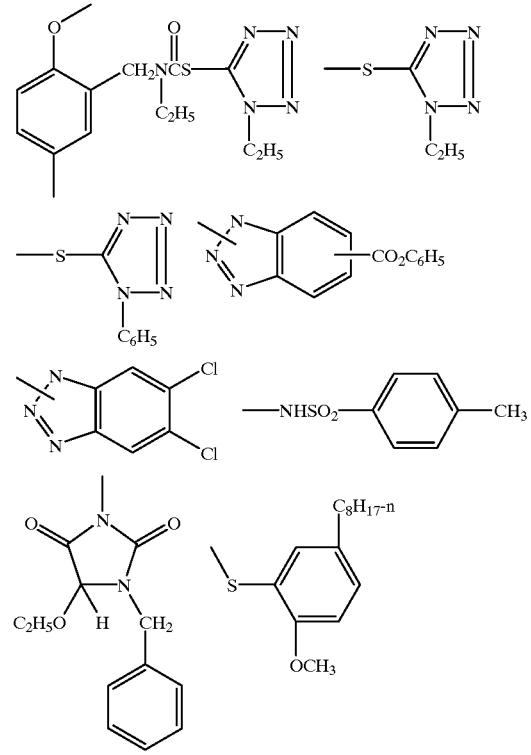

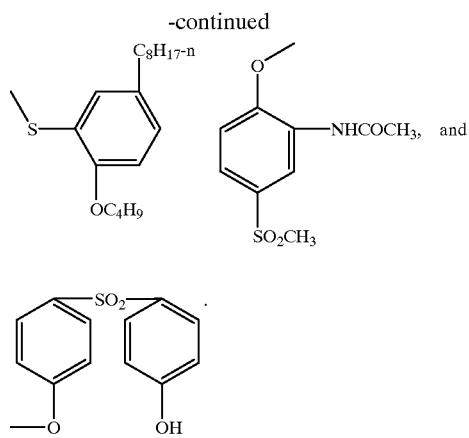

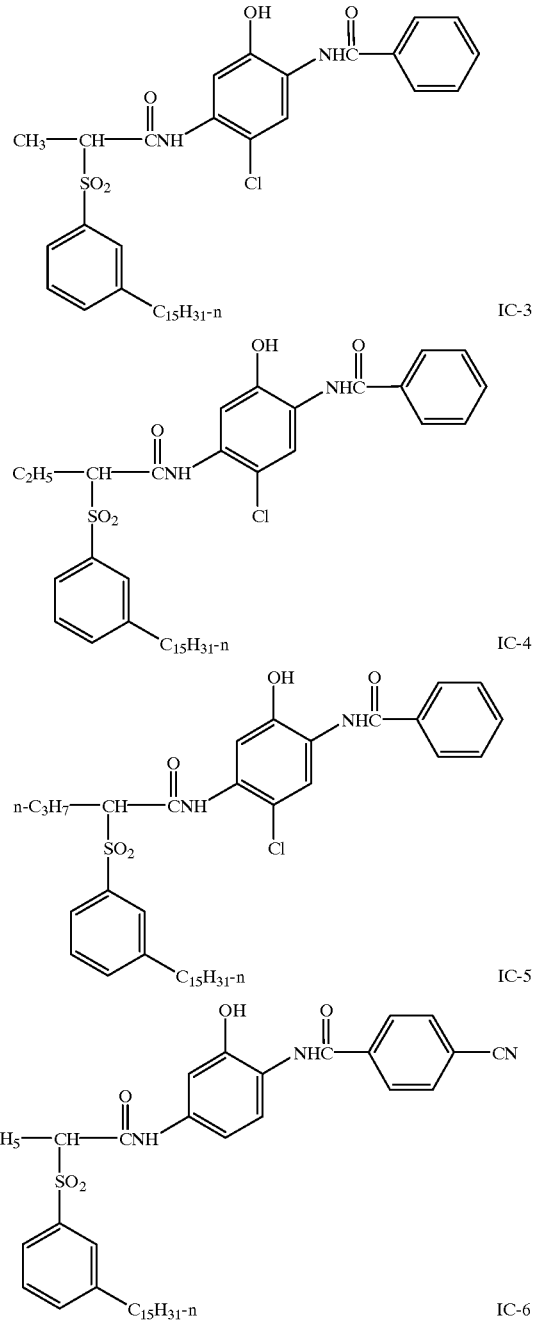

Typically, the coupling-off group is a chlorine atom, hydrogen atom or p-methoxyphenoxy group.

It is essential that the substituent groups be selected so as to adequately ballast the coupler and the resulting dye in the organic solvent in which the coupler is dispersed. The ballasting may be accomplished by providing hydrophobic substituent groups in one or more of the substituent groups. Generally a ballast group is an organic radical of such size and configuration as to confer on the coupler molecule sufficient bulk and aqueous insolubility as to render the coupler substantially nondiffusible from the layer in which it is coated in a photographic element. Thus the combination of substituent are suitably chosen to meet these criteria. To be effective, the ballast will usually contain at least 8 carbon atoms and typically contains 10 to 30 carbon atoms. Suitable ballasting may also be accomplished by providing a plurality of groups which in combination meet these criteria. In the preferred embodiments of the invention $R_1$ in formula (I) is a small alkyl group or hydrogen. Therefore, in these embodiments the ballast would be primarily located as part of the other groups. Furthermore, even if the coupling-off group Z contains a ballast, it is often necessary to ballast other substituents as well, since Z is eliminated from the molecule upon coupling; thus, the ballast is most advantageously provided as part of groups other than Z. The following examples further illustrate preferred coupler of the invention. It is not construed that the present invention is limited to these examples.

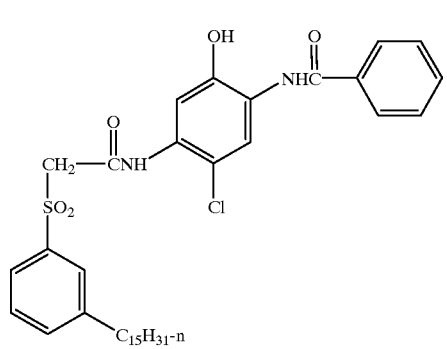

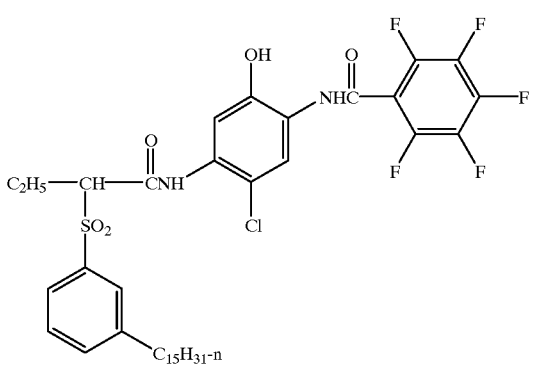

IC-7
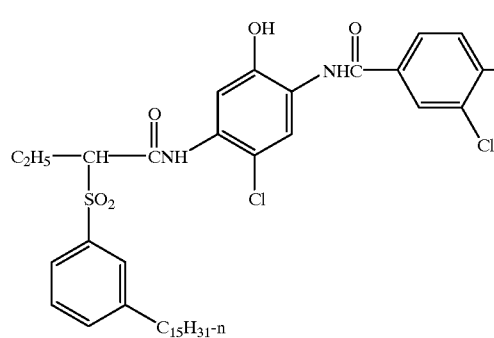
IC-11
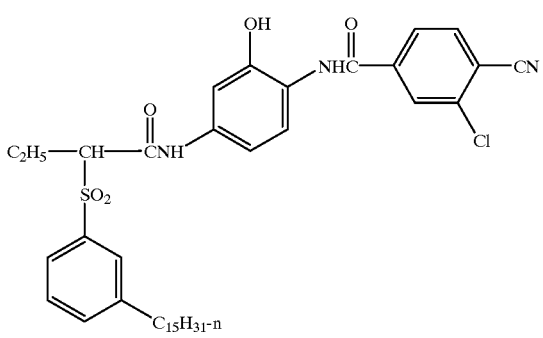
IC-8
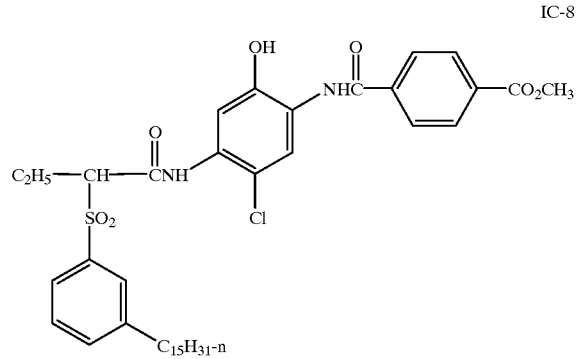
IC-12
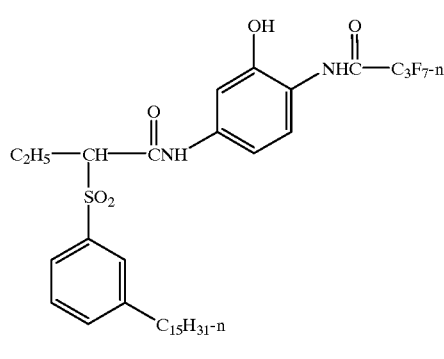
IC-9
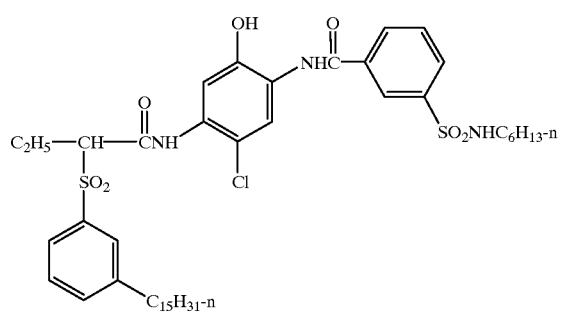
IC-13
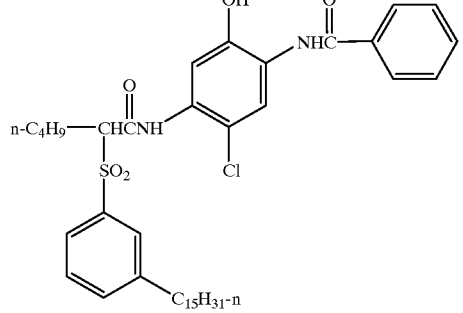
IC-10
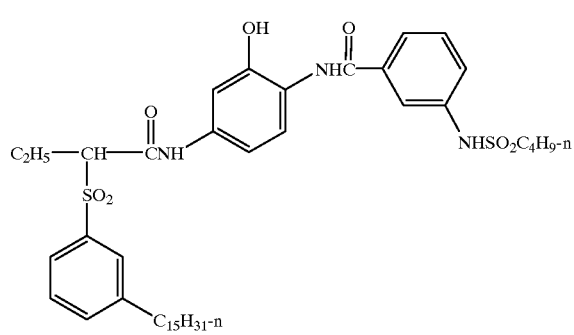
IC-14
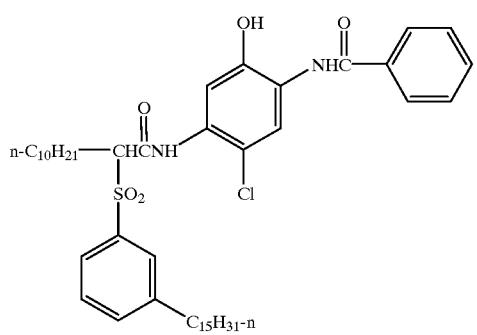

-continued
IC-15
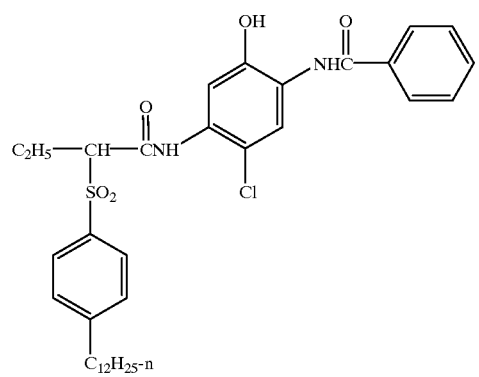
IC-19
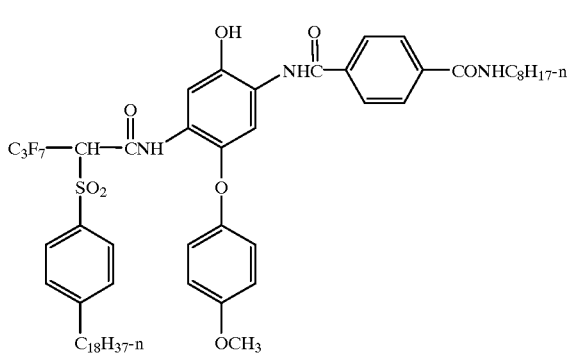
IC-16
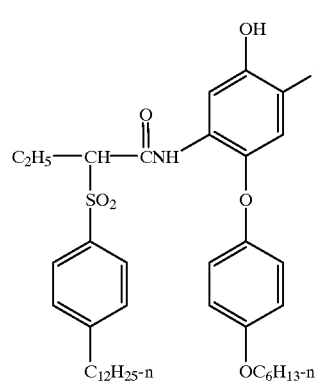
IC-20
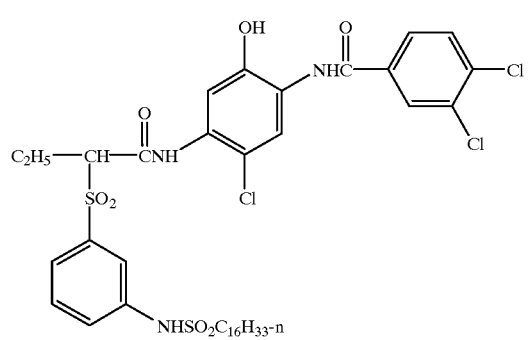
IC-17
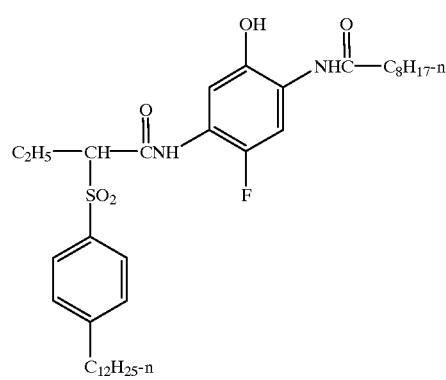
IC-21
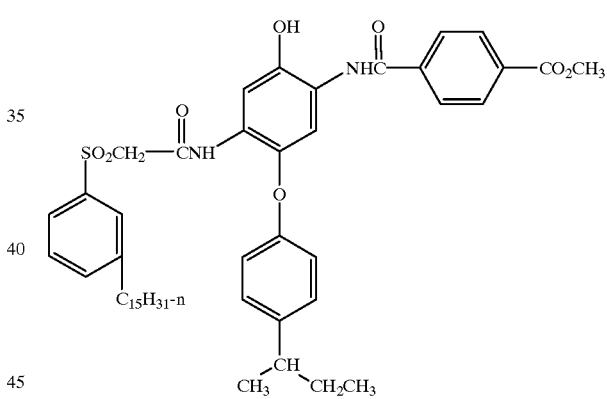
IC-18
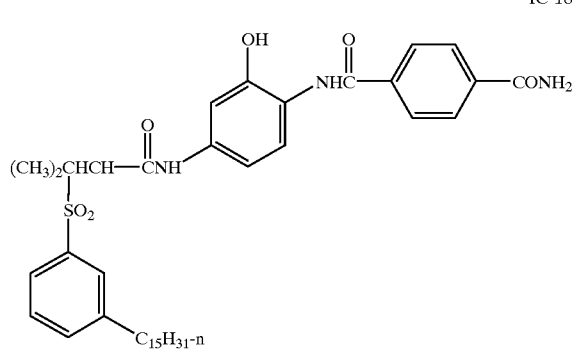
IC-22
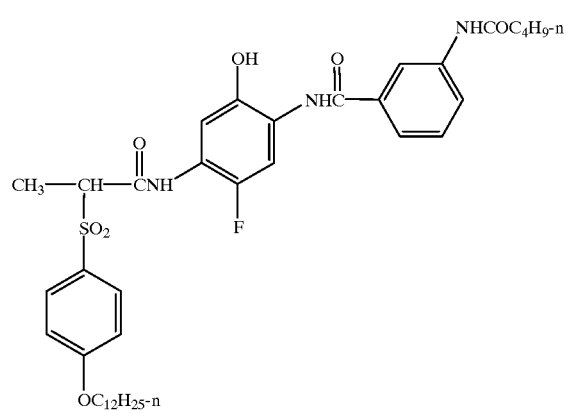

IC-23
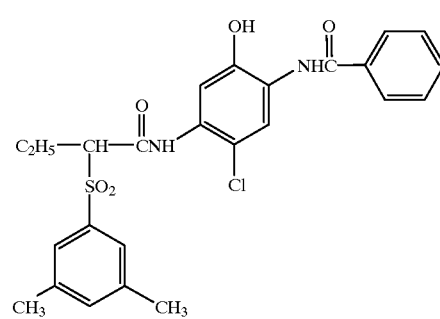
IC-24
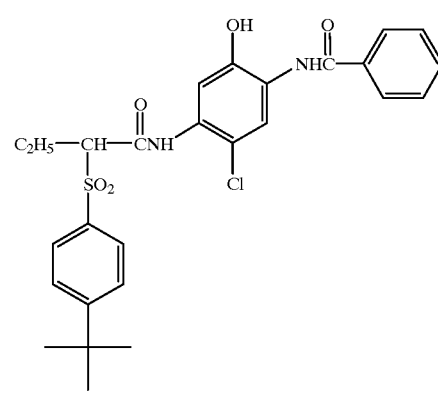
IC-25
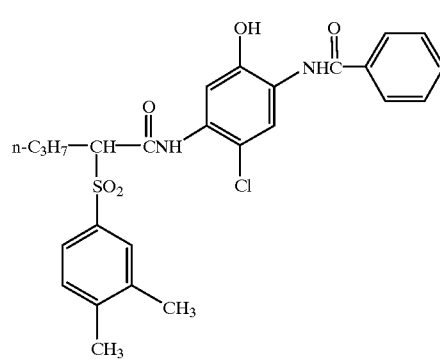
IC-26
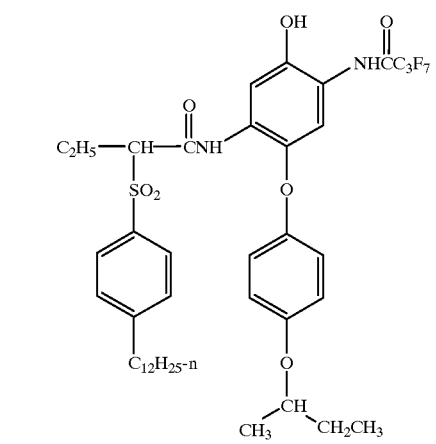
IC-27
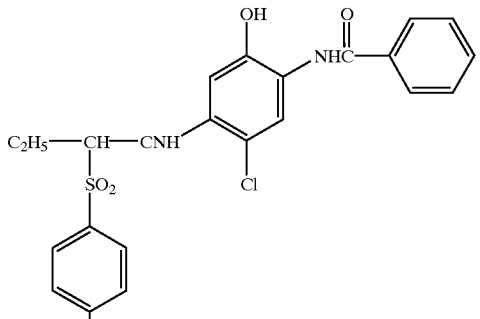
IC-28
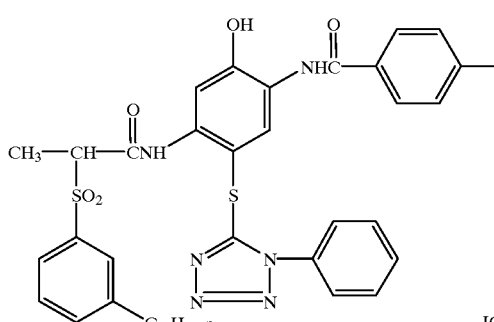
IC-29
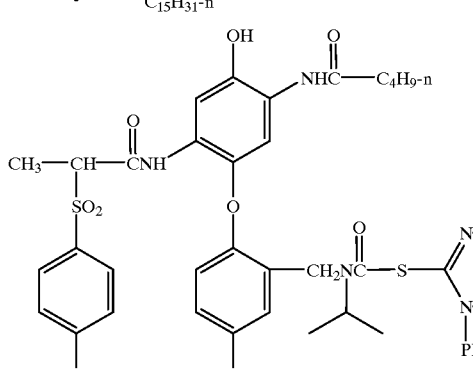
IC-30
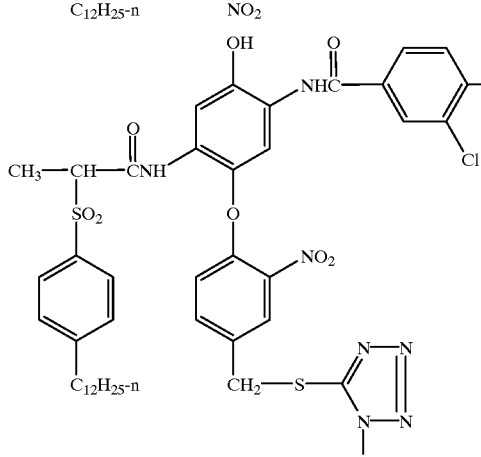

-continued
IC-31
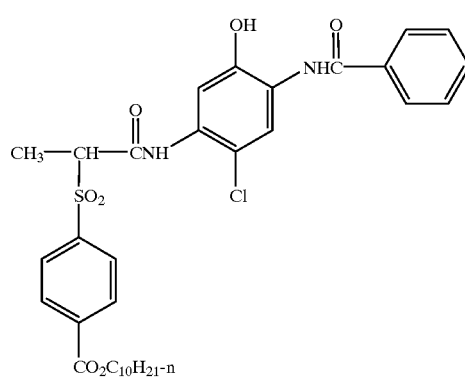
IC-32
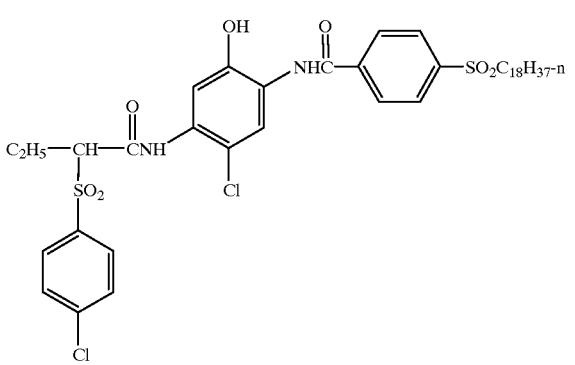
IC-33
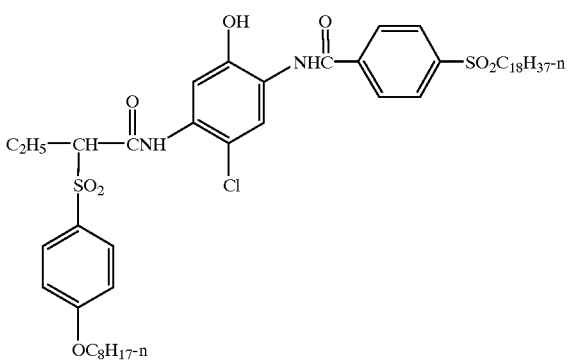
IC-34
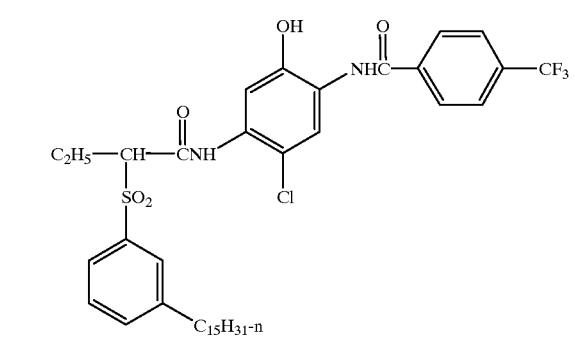
-continued
IC-35
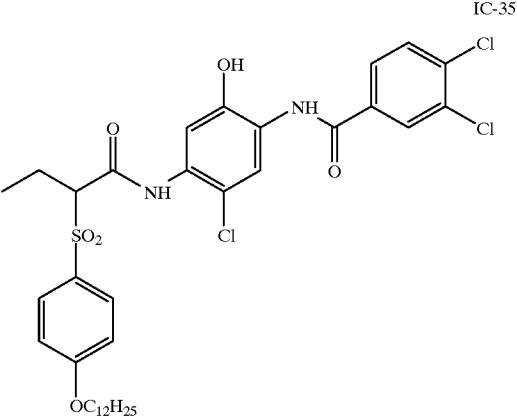
IC-36
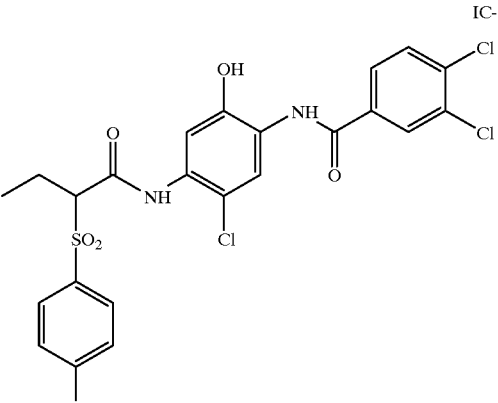
IC-37
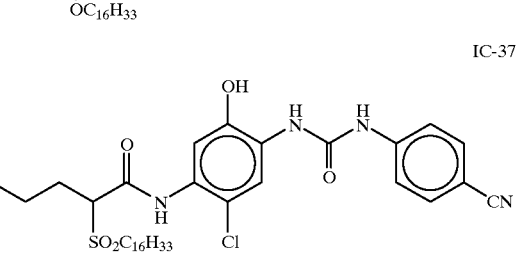
IC-38
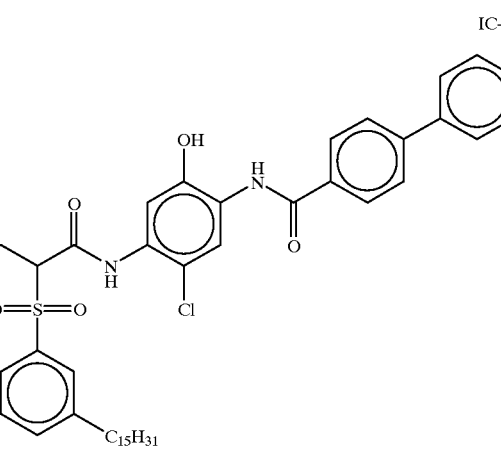

-continued

IC-39

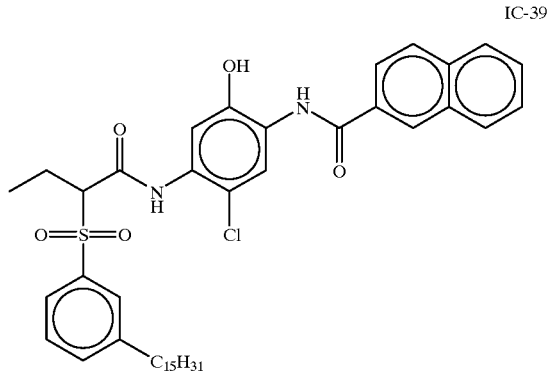

IC-40

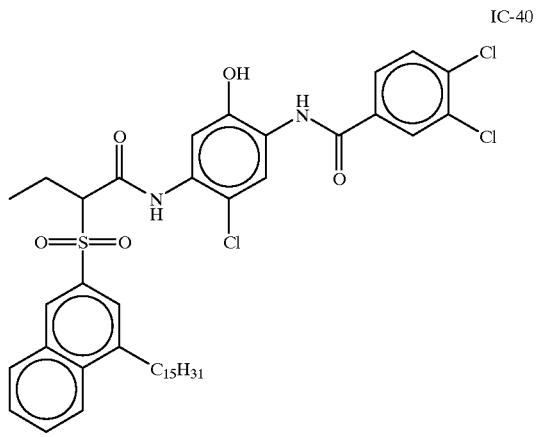

Preferred couplers are IC-3, IC-7, IC-35, and IC-36 because of their suitably narrow left bandwidths.

Couplers that form magenta dyes upon reaction with oxidized color developing agent are described in such representative patents and publications as: U.S. Pat. Nos. 2,311,082; 2,343,703; 2,369,489; 2,600,788; 2,908,573; 3,062,653; 3,152,896; 3,519,429; 3,758,309; and "Farbkuppler-eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents. Especially preferred couplers are 1 H-pyrazolo [5,1-c]-1,2,4-triazole and 1H-pyrazolo [1,5-b]-1,2,4-triazole. Examples of 1H-pyrazolo [5,1-c]-1,2,4-triazole couplers are described in U.K. Pat. Nos. 1,247,493; 1,252,418; 1,398,979; U.S. Pat. Nos. 4,443,536; 4,514,490; 4,540,654; 4,590,153; 4,665,015; 4,822,730; 4,945,034; 5,017,465; and 5,023,170. Examples of 1H-pyrazolo [1,5-b]-1,2,4-triazoles can be found in European Patent applications 176,804; 177,765; U.S Pat. Nos. 4,659,652; 5,066,575; and 5,250,400.

Typical pyrazoloazole and pyrazolone couplers are represented by the following formulas:

MAGENTA-1

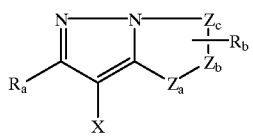

MAGENTA-2

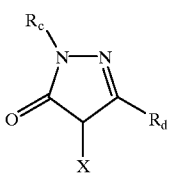

wherein $R_a$ and $R_b$ independently represent H or a substituent; $R_c$ is a substituent (preferably an aryl group); $R_d$ is a substituent (preferably an anilino, carbonamido, ureido, carbamoyl, alkoxy, aryloxycarbonyl, alkoxycarbonyl, or N-heterocyclic group); X is hydrogen or a coupling-off group; and $Z_a$, $Z_b$, and $Z_c$ are independently a substituted methine group, =N—, =C—, or —NH—, provided that one of either the $Z_a$—$Z_b$ bond or the $Z_b$—$Z_c$ bond is a double bond and the other is a single bond, and when the $Z_b$—$Z_c$ bond is a carbon-carbon double bond, it may form part of an aromatic ring, and at least one of $Z_a$, $Z_b$, and $Z_c$ represents a methine group connected to the group $R_b$.

Specific examples of such couplers are:

M-1

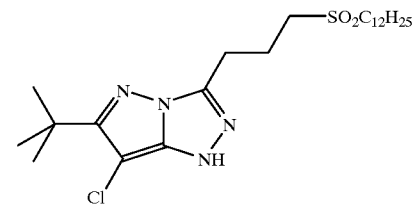

M-2

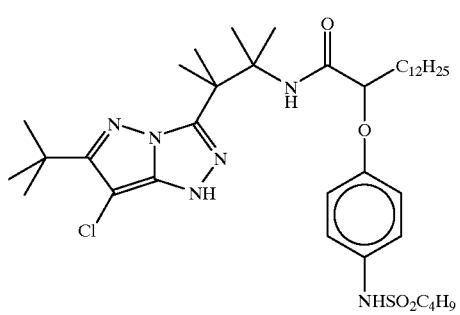

M-3

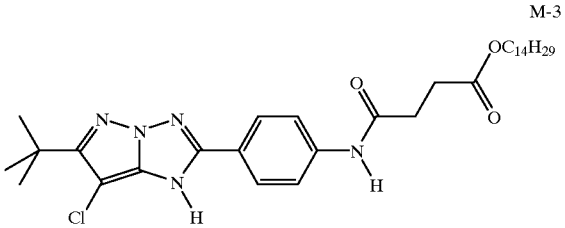

M-4

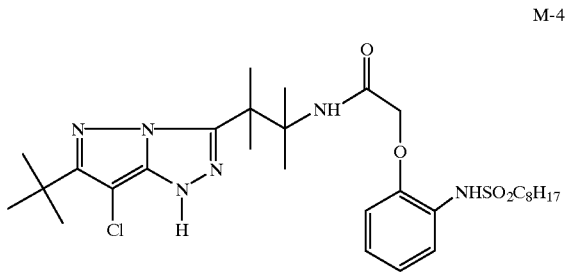

M-5

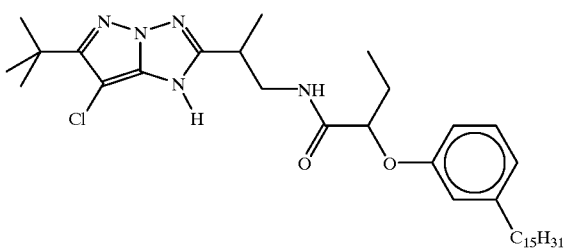

Couplers that form yellow dyes upon reaction with oxidized color developing agent are described in such representative patents and publications as: U.S. Pat. Nos. 2,298,443; 2,407,210; 2,875,057; 3,048,194; 3,265,506; 3,447,928; 3,960,570; 4,022,620; 4,443,536; 4,910,126; and 5,340,703 and "Farbkuppler-eine Literature Ubersicht," published in Agfa Mitteilungen, Band III, pp. 112–126 (1961). Such couplers are typically open chain ketomethylene compounds. Also preferred are yellow couplers such as described in, for example, European Patent Application Nos. 482,552; 510,535; 524,540; 543,367; and U.S. Pat. No. 5,238,803. For improved color reproduction, couplers which give yellow dyes that cut off sharply on the long wavelength side are particularly preferred (for example, see U.S. Pat. No. 5,360,713).

Typical preferred yellow couplers are represented by the following formulas:

YELLOW-1

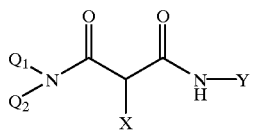

YELLOW-2

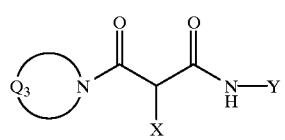

YELLOW-3

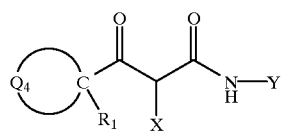

YELLOW-4

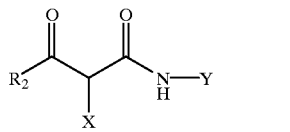

wherein $R_1$, $R_2$, $Q_1$ and $Q_2$ each represents a substituent; X is hydrogen or a coupling-off group; Y represents an aryl group or a heterocyclic group; $Q_3$ represents an organic residue required to form a nitrogen-containing heterocyclic group together with the <N—; and $Q_4$ represents nonmetallic atoms necessary to from a 3- to 5-membered hydrocarbon ring or a 3- to 5-membered heterocyclic ring which contains at least one hetero atom selected from N, O, S, and P in the ring. Particularly preferred is when $Q_1$ and $Q_2$ each represent an alkyl group, an aryl group, or a heterocyclic group, and $R_2$ represents an aryl or tertiary alkyl group.

Preferred yellow couplers can be of the following general structures:

Y-1

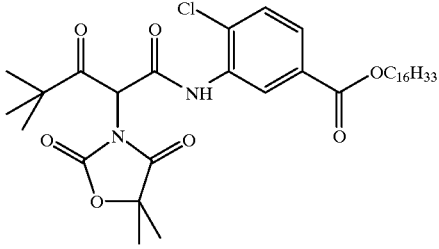

Y-2

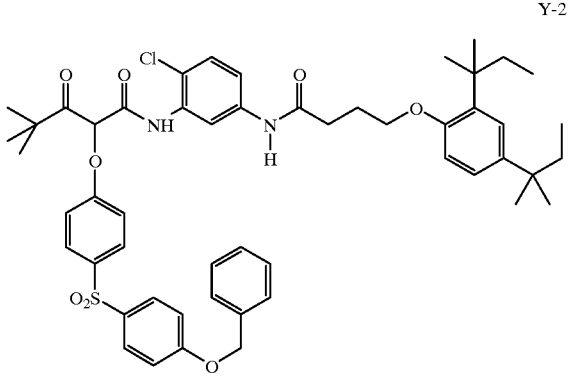

Y-3

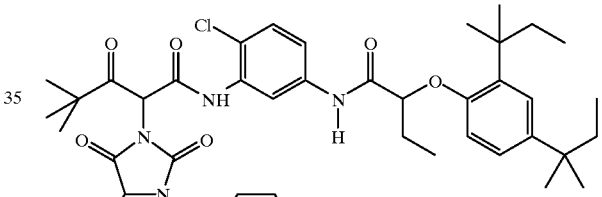

Y-4

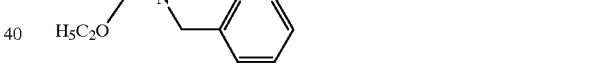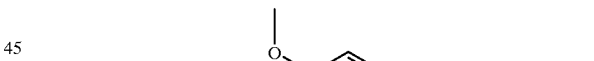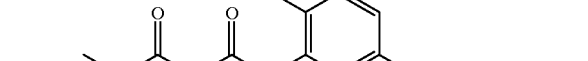

Y-5

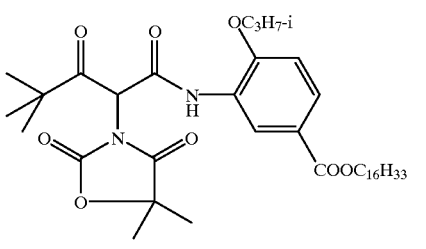

-continued

Y-6

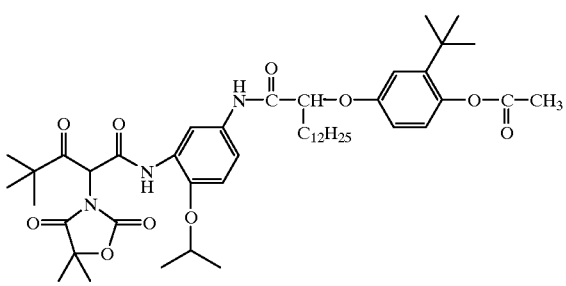

Unless otherwise specifically stated, substituent groups which may be substituted on molecules herein include any groups, whether substituted or unsubstituted, which do not destroy properties necessary for photographic utility. When the term "group" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-.dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amino, such as phenylanilino, 2-chloroanilino, diethylamino, dodecylamino; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing or releasable groups, etc. Generally, the above groups and substituents thereof may include those having up to 48 carbon atoms, typically 1 to 36 carbon atoms and usually less than 24 carbon atoms, but greater numbers are possible depending on the particular substituents selected.

Representative substituents on ballast groups include alkyl, aryl, alkoxy, aryloxy, alkylthio, hydroxy, halogen, alkoxycarbonyl, aryloxcarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents can also be further substituted.

Stabilizers and scavengers that can be used in these photographic elements, but are not limited to, the following.

ST-1
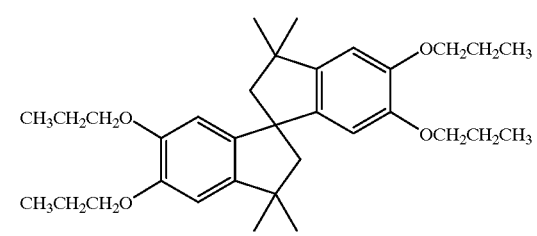
ST-2
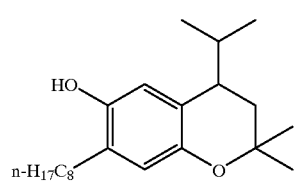
ST-3
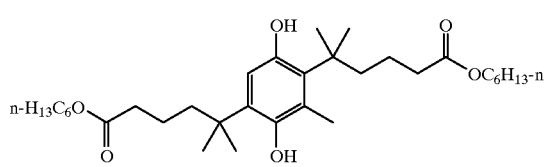
ST-4
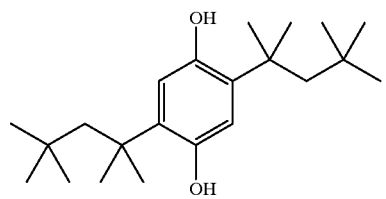
ST-5
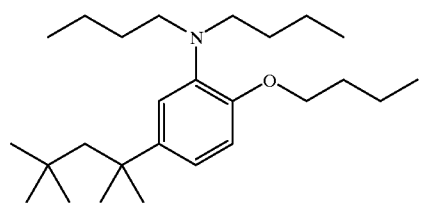
ST-6
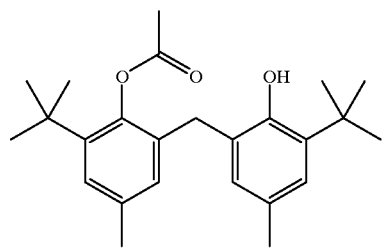
ST-7
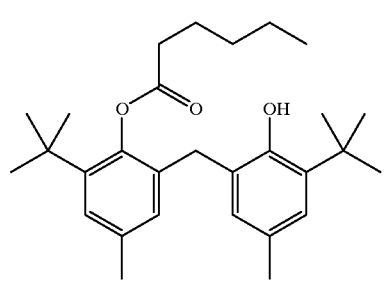
ST-8
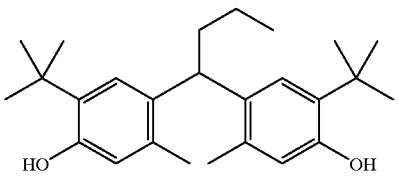
ST-9
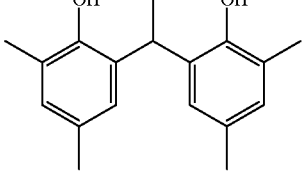
ST-10
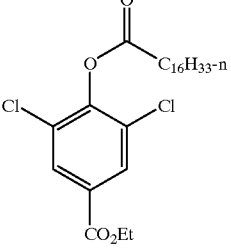
ST-11
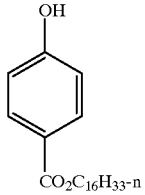
ST-12, ST-13
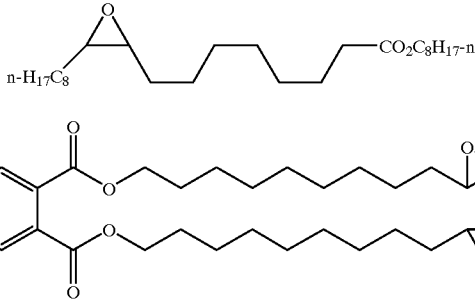
ST-14

ST-15 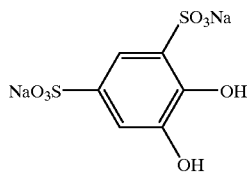

ST-16 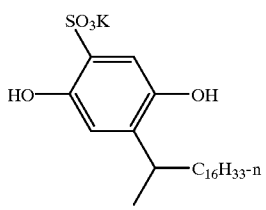

ST-17 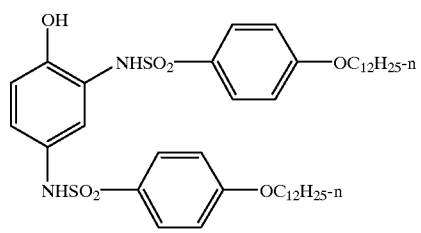

ST-18 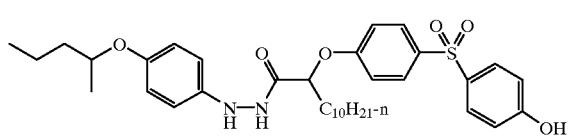

ST-19 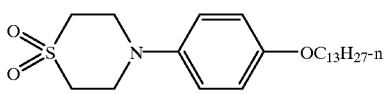

ST-20 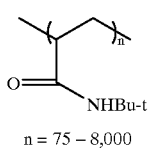
n = 75 – 8,000

ST-21 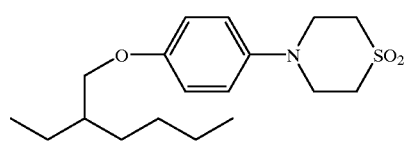

ST-22 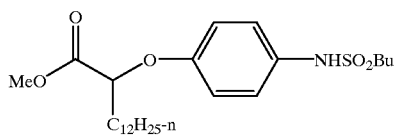

ST-23 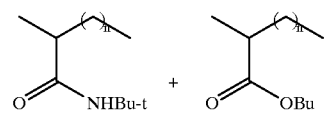
n:m 1:1 mw = 75 – 100,000

ST-24 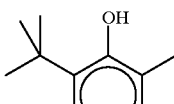

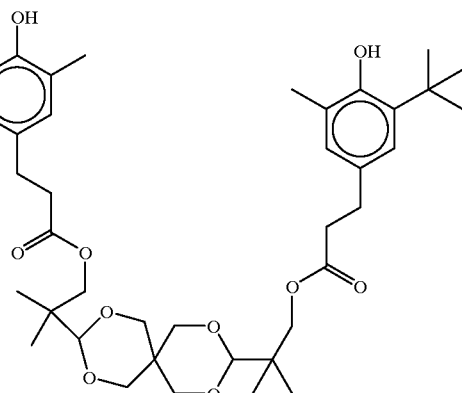

Examples of solvents which may be used in the invention include the following:

| | |
|---|---|
| Tritolyl phosphate | S-1 |
| Dibutyl phthalate | S-2 |
| Diundecyl phthalate | S-3 |
| N,N-Diethyldodecanamide | S-4 |
| N,N-Dibutyldodecanamide | S-5 |
| Tris(2-ethylhexyl)phosphate | S-6 |
| Acetyl tributyl citrate | S-7 |
| 2,4-Di-tert-pentylphenol | S-8 |
| 2-(2-Butoxyethoxy)ethyl acetate | S-9 |
| 1,4-Cyclohexyldimethylene bis(2-ethylhexanoate) | S-10 |

The dispersions used in photographic elements may also include ultraviolet (UV) stabilizers and so-called liquid UV stabilizers such as described in U.S. Pat. Nos. 4,992,358; 4,975,360; and 4,587,346. Examples of UV stabilizers are shown below.

UV-1

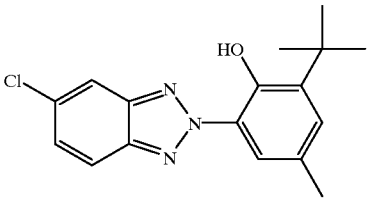

UV-2

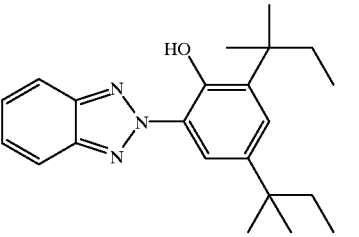

UV-3
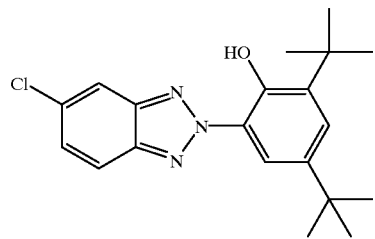

UV-4
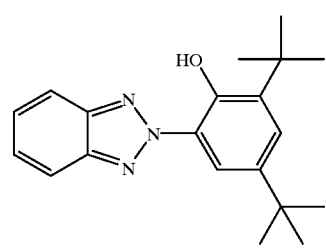

UV-5
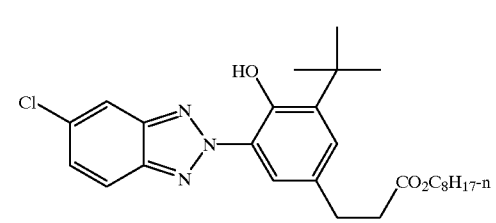

UV-6
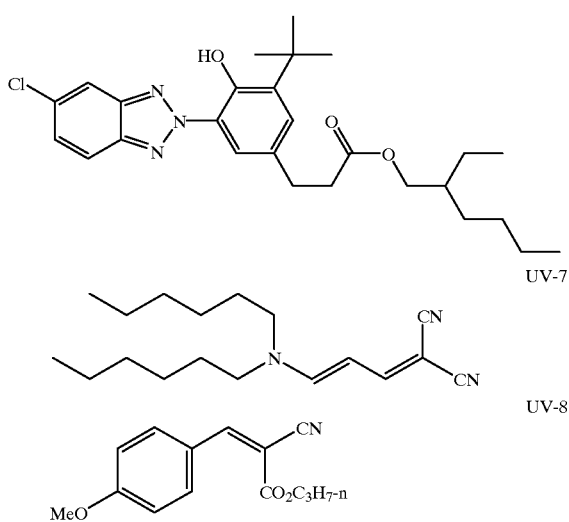

UV-7
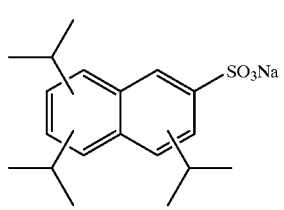

UV-8

SF-2
$CF_3 \cdot (CF_2)_7 \cdot SO_3Na$

SF-3
$CH_3 \cdot (CH_2)_n \cdot SO_3Na$, n = 12 – 14

SF-4
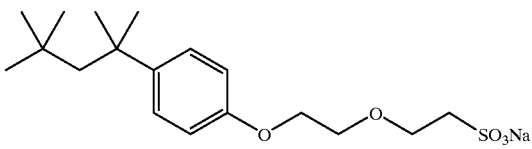

SF-5
$CH_3 \cdot (CH_2)_{11} \cdot OSO_3Na$

SF-6
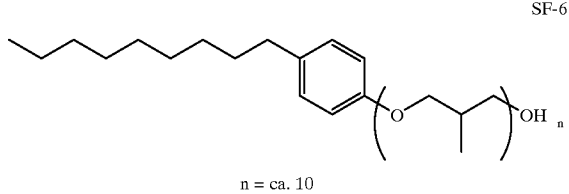
n = ca. 10

SF-7
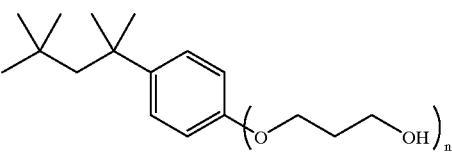
n = ca. 40

SF-8
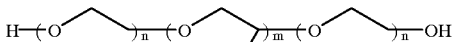
n = ca. 6, m = ca. 2

SF-9
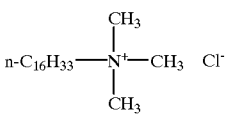

SF-10
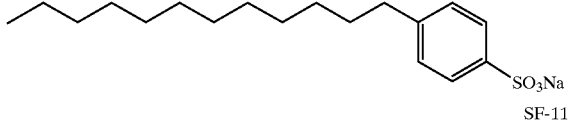

SF-11
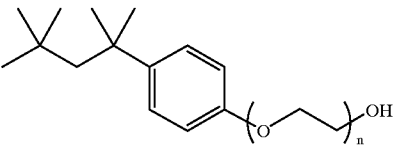
n = ca. 10

SF-12
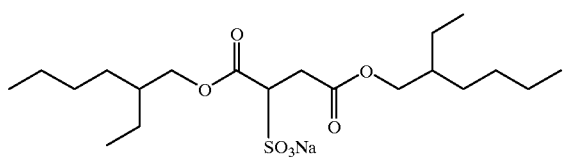

The aqueous phase may include surfactants. Surfactant may be cationic, anionic, zwitterionic or non-ionic. Useful surfactants include, but are not limited to, the following:

SF-1

Further, it is contemplated to stabilize photographic dispersions prone to particle growth through the use of hydrophobic, photographically inert compounds such as disclosed by Zengerle et al U.S. Pat. No. 5,468,604.

In a preferred embodiment the invention employs recording elements which are constructed to contain at least three silver halide emulsion layer units. A suitable full color, multilayer format for a recording element used in the invention is represented by Structure I.

| STRUCTURE I |
|---|
| Red-sensitized |
| cyan dye image-forming silver halide emulsion unit |
| Interlayer |
| Green-sensitized |
| magenta dye image-forming silver halide emulsion unit |
| Interlayer |
| Blue-sensitized |
| yellow dye image-forming silver halide emulsion unit |
| ///// Support ///// | wherein the red-sensitized, cyan dye image-forming silver halide emulsion unit is situated nearest the support; next in order is the green-sensitized, magenta dye image-forming unit, followed by the uppermost blue-sensitized, yellow dye image-forming unit. The image-forming units are separated from each other by hydrophilic colloid interlayers containing an oxidized developing agent scavenger to prevent color contamination. Silver halide emulsions satisfying the grain and gelatino-peptizer requirements described above can be present in any one or combination of the emulsion layer units. Additional useful multicolor, multilayer formats for an element of the invention include structures as described in U.S. Pat. No. 5,783,373. Each of such structures in accordance with the invention preferably would contain at least three silver halide emulsions comprised of high chloride grains having at least 50 percent of their surface area bounded by $\{100\}$ crystal faces and containing dopants from classes (i) and (ii), as described above. Preferably each of the emulsion layer units contains emulsion satisfying these criteria.

Conventional features that can be incorporated into multilayer (and particularly multicolor) recording elements contemplated for use in the method of the invention are illustrated by *Research Disclosure*, Item 38957, cited above:

XI. Layers and layer arrangements
XII. Features applicable only to color negative
XIII. Features applicable only to color positive
  B. Color reversal
  C. Color positives derived from color negatives
XIV. Scan facilitating features.

The recording elements comprising the radiation sensitive high chloride emulsion layers according to this invention can be conventionally optically printed, or in accordance with a particular embodiment of the invention can be image-wise exposed in a pixel-by-pixel mode using suitable high energy radiation sources typically employed in electronic printing methods. Suitable actinic forms of energy encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic or panchromatic. For example, when the recording element is a multilayer multicolor element, exposure can be provided by laser or light emitting diode beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by T. H. James, *The Theory of the Photographic Process*, 4th Ed., Macmillan, 1977, Chapters 4, 6, 17, 18 and 23.

It has been observed that anionic $[MX_x,Y_y,L_z]$ hexacoordination complexes, where M is a group 8 or 9 metal (preferably iron, ruthenium or iridium), X is halide or pseudohalide (preferably Cl, Br or CN) x is 3 to 5, Y is $H_2O$, y is 0 or 1, L is a C—C, H—C or C—N—H organic ligand, and Z is 1 or 2, are surprisingly effective in reducing high intensity reciprocity failure (HIRF), low intensity reciprocity failure (LIRF) and thermal sensitivity variance and in in improving latent image keeping (LIK). As herein employed HIRF is a measure of the variance of photographic properties for equal exposures, but with exposure times ranging from $10^{-1}$ to $10^{-6}$ second. LIRF is a measure of the variance of photographic properties for equal exposures, but with exposure times ranging from $10^{-1}$ to 100 seconds. Although these advantages can be generally compatible with face centered cubic lattice grain structures, the most striking improvements have been observed in high (>50 mole %, preferably ≧90 mole %) chloride emulsions. Preferred C—C, H—C or C—N—H organic ligands are aromatic heterocycles of the type described in U.S. Pat. No. 5,462,849. The most effective C—C, H—C or C—N—H organic ligands are azoles and azines, either unsustituted or containing alkyl, alkoxy, or halide substituents, where the alkyl moieties contain from 1 to 8 carbon atoms. Particularly preferred azoles and azines include thiazoles, thiazolines and pyrazines.

The quantity or level of high energy actinic radiation provided to the recording medium by the exposure source is generally at least $10^{-4}$ ergs/cm$^2$, typically in the range of about $10^{-4}$ ergs/cm$^2$ to $10^{-3}$ ergs/cm$^2$ and often from $10^{-3}$ ergs/cm$^2$ to $10^2$ ergs/cm$^2$. Exposure of the recording element in a pixel-by-pixel mode as known in the prior art persists for only a very short duration or time. Typical maximum exposure times are up to 100 $\mu$p seconds, often up to 10 $\mu$seconds, and frequently up to only 0.5 $\mu$seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm$^2$ and are typically in the range of about $10^4$ to $10^6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988, which is hereby incorporated herein by reference. As previously indicated herein, a description of some of the details of conventional electronic printing methods comprising scanning a recording element with high energy beams such as light emitting diodes or laser beams, are set forth in Hioki U.S. Pat. No. 5,126,235 and European Patent Applications 479 167 Al and 502 508 A1.

Once imagewise exposed, the recording elements can be processed in any convenient conventional manner to obtain a viewable image. Such processing is illustrated by *Research Disclosure*, Item 38957, cited above:

XVIII. Chemical development systems

XIX. Development

XX. Desilvering, washing, rinsing and stabilizing

In addition, a useful developer for the inventive material is a homogeneous, single part developing agent. The homogeneous, single-part color developing concentrate is prepared using a critical sequence of steps:

In the first step, an aqueous solution of a suitable color developing agent is prepared. This color developing agent is generally in the form of a sulfate salt. Other components of the solution can include an antioxidant for the color developing agent, a suitable number of alkali metal ions (in an at least stoichiometric proportion to the sulfate ions) provided by an alkali metal base, and a photographically inactive water-miscible or water-soluble hydroxy-containing organic solvent. This solvent is present in the final concentrate at a concentration such that the weight ratio of water to the organic solvent is from about 15:85 to about 50:50.

In this environment, especially at high alkalinity, alkali metal ions and sulfate ions form a sulfate salt that is precipitated in the presence of the hydroxy-containing organic solvent. The precipitated sulfate salt can then be readily removed using any suitable liquid/solid phase separation technique (including filtration, centrifugation or decantation). If the antioxidant is a liquid organic compound, two phases may be formed and the precipitate may be removed by discarding the aqueous phase.

The color developing concentrates of this invention include one or more color developing agents that are well known in the art that, in oxidized form, will react with dye forming color couplers in the processed materials. Such color developing agents include, but are not limited to, aminophenols, p-phenylenediamines (especially N,N-dialkyl-p-phenylenediamines) and others which are well known in the art, such as EP 0 434 097 A1 (published Jun. 26, 1991) and EP 0 530 921 Al (published Mar. 10, 1993). It may be useful for the color developing agents to have one or more water-solubilizing groups as are known in the art. Further details of such materials are provided in *Research Disclosure*, publication 38957, pages 592–639 (September 1996). *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "*Research Disclosure*".

Preferred color developing agents include, but are not limited to, N,N-diethyl p-phenylenediamine sulfate (KODAK Color Developing Agent CD-2), 4-amino-3-methyl-N-(2-methane sulfonamidoethyl)aniline sulfate, 4-(N-ethyl-N-β-hydroxyethylamino)-2-methylaniline sulfate (KODAK Color Developing Agent CD-4), p-hydroxyethylethylaminoaniline sulfate, 4-(N-ethyl-N-2-methanesulfonylaminoethyl)-2-methylphenylenediamine sesquisulfate (KODAK Color Developing Agent CD-3), 4-(N-ethyl-N-2-methanesulfonylaminoethyl)-2-methylphenylenediamine sesquisulfate, and others readily apparent to one skilled in the art.

In order to protect the color developing agents from oxidation, one or more antioxidants are generally included in the color developing compositions. Either inorganic or organic antioxidants can be used. Many classes of useful antioxidants are known, including but not limited to, sulfites (such as sodium sulfite, potassium sulfite, sodium bisulfite and potassium metabisulfite), hydroxylamine (and derivatives thereof), hydrazines, hydrazides, amino acids, ascorbic acid (and derivatives thereof), hydroxamic acids, aminoketones, mono-and polysaccharides, mono- and polyamines, quaternary ammonium salts, nitroxy radicals, alcohols, and oximes. Also useful as antioxidants are 1,4-cyclohexadiones. Mixtures of compounds from the same or different classes of antioxidants can also be used if desired.

Especially useful antioxidants are hydroxylamine derivatives as described, for example, in U.S. Pat. Nos. 4,892,804; 4,876,174; 5,354,646; and 5,660,974, all noted above, and U.S. Pat. No. 5,646,327 (Burns et al). Many of these antioxidants are mono- and dialkylhydroxylamines having one or more substituents on one or both alkyl groups. Particularly useful alkyl substituents include sulfo, carboxy, amino, sulfonamido, carbonamido, hydroxy, and other solubilizing substituents.

More preferably, the noted hydroxylamine derivatives can be mono- or dialkylhydroxylamines having one or more hydroxy substituents on the one or more alkyl groups. Representative compounds of this type are described, for example, in U.S. Pat. No. 5,709,982 (Marrese et al), as having the structure I:

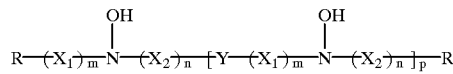

wherein R is hydrogen, a substituted or unsubstituted alkyl group of 1 to 10 carbon atoms, a substituted or unsubstituted hydroxyalkyl group of 1 to 10 carbon atoms, a substituted or unsubstituted cycloalkyl group of 5 to 10 carbon atoms, or a substituted or unsubstituted aryl group having 6 to 10 carbon atoms in the aromatic nucleus.

$X_1$ is —$CR_2(OH)CHR_1$— and $X_2$ is —$CHR_1CR_2(OH)$— wherein $R_1$ and $R_2$ are independently hydrogen, a substituted or unsubstituted alkyl group or 1 or 2 carbon atoms, a substituted or unsubstituted hydroxyalkyl group of 1 or 2 carbon atoms, or $R_1$ and $R_2$ together represent the carbon atoms necessary to complete a substituted or unsubstituted 5- to 8-membered saturated or unsaturated carbocyclic ring structure.

Y is a substituted or unsubstituted alkylene group having at least 4 carbon atoms, and has an even number of carbon atoms, or Y is a substituted or unsubstituted divalent aliphatic group having an even total number of carbon and oxygen atoms in the chain, provided that the aliphatic group has a least 4 atoms in the chain.

Also in Structure I, m, n, and p are independently 0 or 1. Preferably, each of m and n is 1, and p is 0.

Specific di-substituted hydroxylamine antioxidants include, but are not limited to, N,N-bis(2,3-dihydroxypropyl)hydroxylamine, N,N-bis(2-methyl-2,3-dihydroxypropyl)hydroxylamine and N,N-bis(1-hydroxymethyl-2-hydroxy-3-phenylpropyl)hydroxylamine. The first compound is preferred.

The following examples illustrate the practice of this invention. They are not intended to be exhaustive of all possible variations of the invention. Parts and percentages are by weight unless otherwise indicated.

EXAMPLES

Example 1

In this example, a heat shrinkable sheet was pressure sensitive adhesive laminated to the back side of a cellulose base paper typical of base papers utilized in imaging supports. The base material of the invention consisting of the cellulose base paper, a biaxially oriented polyolefin top sheet, and the back heat shrinkable sheet was coated with silver halide imaging layers. After exposure and development, the heat shrinkable sheet was heated to several different temperatures and the curl of the image was recorded. This example will demonstrate an imaging element that changes dimension by the use of heat applied to the back side of the image element.

Cellulose Paper Base Utilized in the Example:

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 2.0% $TiO_2$ on a dry weight basis. An about 110 g/m$^2$ bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

The imaging base of the invention was prepared by extrusion laminating the following top biaxially oriented polyolefin sheet to one side of the grade cellulose paper support.

Top Biaxially Oriented Sheet:

A composite 5 layer biaxially oriented polyolefin sheet (38 μm thick) (d=0.75 g/cc) consisting of a microvoided and oriented polypropylene core (approximately 73% of the total sheet thickness), with a titanium dioxide pigmented system (including required color adjustment) non-microvoided oriented polypropylene layer on the top side with blue colorant and optical brightener and a 1.2 micrometers layer of medium density polyethylene as the topmost layer and a clear non-microvoided oriented polypropylene layer on the bottom side of the voided layer; the void initiating material is poly(butylene terephthalate).

The following heat shrinkable sheet was laminated to the opposite side of the cellulose paper base utilizing an acrylic based pressure sensitive adhesive.

Bottom Heat Shrinkable Polymer Sheet:

A one layer biaxially oriented polypropylene sheet. The polypropylene sheet was 25 μm thick and the density was 0.90 g/cc).

The following light sensitive silver halide imaging layers were utilized to prepare imaging element with dimensional adjustment by heat utilizing the invention support material. The following imaging layers were coated on the support material of the invention utilizing curtain coating. Silver chloride emulsions were chemically and spectrally sensitized as described below. A biocide comprising a mixture of N-methyl-isothiazolone and N-methyl-5-chloroisothiazolone was added after sensitization.

Blue Sensitive Emulsion (Blue EM-1). A high chloride silver halide emulsion is precipitated by adding approximately equimolar silver nitrate and sodium chloride solutions into a well-stirred reactor containing glutaryldiaminophenyldisulfide, gelatin peptizer, and thioether ripener. Cesium pentachloronitrosylosmate(II) dopant is added during the silver halide grain formation for most of the precipitation, followed by the addition of potassium hexacyanoruthenate(II), potassium (5-methylthiazole)-pentachloroiridate, a small amount of KI solution, and shelling without any dopant. The resultant emulsion contains cubic shaped grains having edge length of 0.6 μm. The emulsion is optimally sensitized by the addition of a colloidal suspension of aurous sulfide and heat ramped to 60° C., during which time blue sensitizing dye BSD-4, potassium hexchloroiridate, Lippmann bromide, and 1-(3-acetamidophenyl)-5-mercaptotetrazole were added.

Green Sensitive Emulsion (Green EM-1): A high chloride silver halide emulsion is precipitated by adding approximately equimolar silver nitrate and sodium chloride solutions into a well-stirred reactor containing gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic shaped grains of 0.3 μm in edge length size. The emulsion is optimally sensitized by the addition of glutaryldiaminophenyldisulfide, a colloidal suspension of aurous sulfide and heat ramped to 55° C., during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1): A high chloride silver halide emulsion is precipitated by adding approximately equimolar silver nitrate and sodium chloride solutions into a well-stirred reactor containing gelatin peptizer and thioether ripener. During the silver halide grain formation, potassium hexacyanoruthenate(II) and potassium (5-methylthiazole)-pentachloroiridate are added. The resultant emulsion contains cubic shaped grains of 0.4 μm in edge length size. The emulsion is optimally sensitized by the addition of glutaryldiaminophenyldisulfide, sodium thiosulfate, tripotassium bis{2-[3-(2-sulfobenzamido)phenyl]-mercaptotetrazole} gold(I) and heat ramped to 64° C., during which time 1-(3-acetamidophenyl)-5-mercaptotetrazole, potassium hexachloroiridate, and potassium bromide are added. The emulsion is then cooled to 40° C., pH adjusted to 6.0, and red sensitizing dye RSD-1 is added.

Coupler dispersions were emulsified by methods well known to the art.

| Layer | Item | Laydown (g/m$^2$) |
| --- | --- | --- |
| Layer 1 | Blue Sensitive Layer | |
| | Gelatin | 1.3127 |
| | Blue sensitive silver (Blue EM-1) | 0.2399 |
| | Y-4 | 0.4143 |
| | ST-23 | 0.4842 |
| | Tributyl Citrate | 0.2179 |
| | ST-24 | 0.1211 |
| | ST-16 | 0.0095 |
| | Sodium Phenylmercaptotetrazole | 0.0001 |
| | Piperidino hexose reductone | 0.0024 |
| | 5-chloro-2-methyl-4-isothiazolin-3-one/2-methyl-4-isothiazolin-3-one(3/1) | 0.0002 |
| | SF-1 | 0.0366 |
| | Potassium chloride | 0.0204 |
| | Dye-1 | 0.0148 |

-continued

| Layer | Item | Laydown (g/m²) |
|---|---|---|
| Layer 2 | Interlayer | |
| | Gelatin | 0.7532 |
| | ST-4 | 0.1076 |
| | S-3 | 0.1969 |
| | 5-chloro-2-methyl-4-isothiazolin-3-one/2-methyl-4-isothiazolin-3-one(3/1) | 0.0001 |
| | Catechol disulfonate | 0.0323 |
| | SF-1 | 0.0081 |
| Layer 3 | Green Sensitive Layer | |
| | Gelatin | 1.1944 |
| | Green Sensitive Silver (Green EM-1) | 0.1011 |
| | M-4 | 0.2077 |
| | Oleyl Alcohol | 0.2174 |
| | S-3 | 0.1119 |
| | ST-21 | 0.0398 |
| | ST-22 | 0.2841 |
| | Dye-2 | 0.0073 |
| | 5-chloro-2-methyl-4-isothiazolin-3-one/2-methyl-4-isothiazolin-3-one(3/1) | 0.0001 |
| | SF-1 | 0.0236 |
| | Potassium chloride | 0.0204 |
| | Sodium Phenylmercaptotetrazole | 0.0007 |
| Layer 4 | M/C Interlayer | |
| | Gelatin | 0.7532 |
| | ST-4 | 0.1076 |
| | S-3 | 0.1969 |
| | Acrylamide/t-Butylacrylamide sulfonate copolymer | 0.0541 |
| | Bis-vinylsulfonylmethane | 0.1390 |
| | 3,5-Dinitrobenzoic acid | 0.0001 |
| | Citric acid | 0.0007 |
| | Catechol disulfonate | 0.0323 |
| | 5-chloro-2-methyl-4-isothiazolin-3-one/2-methyl-4-isothiazolin-3-one(3/1) | 0.0001 |
| Layer 5 | Red Sensitive Layer | |
| | Gelatin | 1.3558 |
| | Red Sensitive silver (Red EM-1) | 0.1883 |
| | IC-35 | 0.2324 |
| | IC-36 | 0.0258 |
| | UV-2 | 0.3551 |
| | Dibutyl sebacate | 0.4358 |
| | S-6 | 0.1453 |
| | Dye-3 | 0.0229 |
| | Potassium p-toluenethiosulfonate | 0.0026 |
| | 5-chloro-2-methyl-4-isothiazolin-3-one/2-methyl-4-isothiazolin-3-one(3/1) | 0.0001 |
| | Sodium Phenylmercaptotetrazole | 0.0005 |
| | SF-1 | 0.0524 |
| Layer 6 | UV Overcoat | |
| | Gelatin | 0.8231 |
| | UV-1 | 0.0355 |
| | UV-2 | 0.2034 |
| | ST-4 | 0.0655 |
| | SF-1 | 0.0125 |
| | S-6 | 0.0797 |
| | 5-chloro-2-methyl-4-isothiazolin-3-one/2-methyl-4-isothiazolin-3-one(3/1) | 0.0001 |
| Layer 7 | SOC | |
| | Gelatin | 0.6456 |
| | Ludox AM ™ (colloidal silica) | 0.1614 |
| | Polydimethylsiloxane (DC200 ™) | 0.0202 |
| | 5-chloro-2-methyl-4-isothiazolin-3-one/2-methyl-4-isothiazolin-3-one(3/1) | 0.0001 |
| | SF-2 | 0.0032 |
| | Tergitol 15-S-5 ™ (surfactant) | 0.0020 |
| | SF-1 | 0.0081 |
| | Aerosol OT ™ (surfactant) | 0.0029 |

The silver halide imaging layers described above were applied to the polyethylene shin layer of the transparent polymer sheet using curtain coating. The light sensitive silver halide imaging layers were printed and developed utilizing RA4 processing chemistry. Structure of the imaging element of the invention was as follows:

| L1 | Silver Halide formed Image | |
|---|---|---|
| L2 | Medium Density Polyethylene + Blue tint | 0.8 μm |
| L3 | Clear Polypropylene with Optical Brightener | ~5.5 μm |
| L4 | Void polypropylene with PBT | 16.5 μm |
| L5 | Clear Polypropylene | 7 μm |
| L6 | Clear Polypropylene | 0.8 μm |
| L7 | 13 MI Medium density clear polyethylene | 10 μm |
| L8 | 130 g/m² photo grade paper Cornea treated each side | 170 μm |
| L9 | Acrylic pressure sensitive adhesive | 8 μm |
| L10 | Biaxially oriented polyproplyene shrink film | 25 μm |
| L11 | Conductive/Writable antistat | |

The imaging element containing the developed silver halide imaging layers were converted into 10 cm×15 cm images that were representative of a typical consumer image format. The heat shrinkable sheet the opposite side of the developed images were heated utilizing heated air at different temperatures. Listed in Table 1 below is the temperature of the heated air and the amount of back curl contained in the imaging element. Curl values are the measurement amount of deflection in the parabolically deformed sample. The curl readings are expressed in ANSI curl units, specifically, 100 divided by the radius of curvature in centimeters. The radius of curvature is determined by visually comparing the curled shape, sighting along the axis of curl, with standard curves in the background. The curl may be positive or negative, and for imaging supports, the convention is that the positive direction is curling towards the imaging layer. The mean curl value for 10 samples is listed in Table 1.

TABLE 1

| Temperature (degrees C.) | Curl (curl units) |
|---|---|
| 20 | −2 |
| 93 | −22 |
| 104 | −38 |
| 116 | −53 |

As can be seen from the curl results above, by applying heat to the backside of the imaging element of the invention, the curl of the silver halide imaging element was changed. The curl of the imaging element was changed from a −2, typical of prior art images to a −53 curl by applying heat to the heat shrinkable sheet on the backside of the imaging element. Further, as can be seen in the image curl data in Table 1, the curl of the image element is related to the temperature of the heated air applied to the backside of the image element, thus providing a level of control and predictability. A curl change of −53 has been shown to offset the curl from the expansion and contraction of imaging systems that utilize gelatin. The curl of the image element would continue to increase until the residual stresses in the heat shrinkable sheet approached zero. That end point is typically encountered when the heat shrinkable sheet is at a 75% shrink.

This invention has significant commercial value in that the curl of a laminated support can be controlled during the manufacturing process. This allows the curl of the support to be changed for various imaging layer designs so that the net image curl is near zero. Prior art melt extruded polyethylene imaging supports require expensive modification of the support design to achieve an acceptable image curl. An example is the gelatin coating applied on the backside of prior art ink jet reflective paper. The purpose of this gelatin coating is to balance the image for curl and is expensive, as extra materials and an additional coating operation are required to control curl. Further, consumers can adjust the dimension of images by applying heat to the image element. This would allow consumers to change flat images to arcuate images that stand on edge and can be formed around shapes.

Finally, while this example relates to silver halide images, this invention is useful as a base material for other imaging technologies such as ink jet printing, thermal dye transfer printing, and electrophohotgraphy particularly when image curl is an important customer feature or when the image needs to be formed into a curved shape.

The invention has been described in detail with particular reference to certain preferred embodiments thereof, but it will be understood that variations and modifications can be effected within the spirit and scope of the invention.

What is claimed is:

1. An imaging member comprising an image layer and a base wherein said base comprises at least one layer of heat shrinkable sheet and at least one strength layer, wherein said heat shrinkable sheet comprises a polymer sheet that when subjected to heat shrinks by an amount of greater than 5%.

2. The imaging member of claim 1 wherein said at least one heat shrinkable sheet has a water transmission rate of between 5 and 500 g/m$^2$/24hr.

3. The imaging member of claim 1 further comprising wherein said image layer comprises at least one layer of photosensitive silver halide.

4. The imaging member of claim 1 further comprising wherein said image layer comprises at least one layer of ink jet receiving material.

5. The imaging member of claim 1 further comprising wherein said image layer comprises at least one layer of thermal dye transfer receiving material.

6. The imaging member of claim 1 further comprising wherein said image layer comprises at least one layer of electrophotographic imaging forming material.

7. The imaging member of claim 1 further comprising wherein said image layer comprises at least one layer of lithographic ink.

8. The imaging member of claim 1 wherein said strength layer has a stiffness of at least 100 millinewtons.

9. The imaging member of claim 3 wherein said strength layer has a stiffness of between 100 and 800 millinewtons.

10. The imaging member of claim 1 wherein said strength layer has an elastic modulus of at least 600 MPa.

11. The imaging member of claim 9 wherein said strength layer has an elastic modulus of between 600 and 3,500 MPa.

12. The imaging member of claim 1 wherein said strength layer comprises paper.

13. The imaging member of claim 1 wherein said strength layer comprises at least one biaxially oriented polyolefin sheet.

14. The imaging member of claim 1 wherein said strength layer comprises at least layer of polyester sheet.

15. The imaging member of claim 1 wherein said at least one heat shrinkable sheet has an oxygen transmission rate of between 2 and 120 cc/m$^2$/24hr.

16. The imaging member of claim 11 wherein said heat shrinkable sheet comprises a polymer sheet that when subjected to heat shrinks by an amount of between 15 and 30%.

17. The imaging member of claim 1 wherein said heat shrinkable sheet is located adjacent to said image layer.

18. The imaging member of claim 1 wherein said heat shrinkable sheet is located below said strength layer.

19. The imaging member of claim 1 wherein said at least one heat shrinkable sheet is located above said strength layer and at least one heat shrinkable sheet is located below said strength layer.

20. The imaging member of claim 1 wherein said at least one heat shrinkable sheet is located within said strength layer.

21. The imaging member of claim 1 wherein said at least one heat shrinkable sheet comprises a polyolefin polymer.

22. The imaging member of claim 1 wherein said at least one heat shrinkable sheet comprises integral sheets of more than one layer.

23. The imaging member of claim 1 wherein said at least one heat shrinkable sheet and said at least strength layer are adhesively connected.

24. The imaging member of claim 1 wherein said at least one heat shrinkable sheet has a shrink tension at 95° C. is between 7 and 3800 MPa.

25. A method comprising, providing an imaging member, said imaging member comprising an imaging layer and a base, forming an image in said imaging layer, and heating at least a portion of said imaging member wherein said imaging member base comprises at least one layer of heat shrinkable sheet and at least one strength layer.

26. The method of claim 25 wherein said heat is applied by use of heated rolls.

27. The method of claim 25 wherein said heat is applied by use of heated air.

28. The method of claim 25 wherein said member has said heat shrinkable layer below said strength layer and said heat is applied from the backside to form a member arcuate in one dimension.

29. The method of claim 25 wherein said member has said heat shrinkable layer below said strength layer and said heat is applied from the backside to form a member arcuate in more than one dimension.

30. The method of claim 28 wherein the arcuate member can stand up without support.

* * * * *